United States Patent [19]
Fong

[11] 3,973,087
[45] Aug. 3, 1976

[54] SIGNAL REPEATER FOR POWER LINE ACCESS DATA SYSTEM
[75] Inventor: Kouan Fong, Schenectady, N.Y.
[73] Assignee: General Electric Company, Schenectady, N.Y.
[22] Filed: Dec. 5, 1974
[21] Appl. No.: 529,999

[52] U.S. Cl. .............................. 179/170 R; 179/2 R; 340/150; 340/310 R
[51] Int. Cl.² ...................... H04B 3/58; H04B 3/38
[58] Field of Search ............ 340/150, 171 R, 310 R, 340/310 A, 163, 211, 291; 179/2 A, 170 R, 170 C, 2 AM, 2 R

[56] References Cited
UNITED STATES PATENTS

| | | |
|---|---|---|
| 3,656,112 | 4/1972 | Paull .............................. 340/310 R |
| 3,693,155 | 9/1972 | Crafton et al. ................... 340/310 R |
| 3,761,914 | 9/1973 | Hardy et al. ..................... 340/310 R |
| 3,815,119 | 6/1974 | Finlay, Jr. et al. ............... 340/310 R |
| 3,911,415 | 10/1975 | Whyte .............................. 340/150 |

Primary Examiner—Kathleen H. Claffy
Assistant Examiner—Randall P. Myers
Attorney, Agent, or Firm—Geoffrey H. Krauss; Joseph T. Cohen; Jerome C. Squillaro

[57] ABSTRACT

A signal repeater is described for relaying information in a two-way communication system superimposed on a power distribution network. The repeater senses signals passing in either direction in the system, translates the received signal to a different band or group frequencies, and transmits the frequency translated information. Provision is made for address-coding the repeaters so that, when connected in several levels, a particular path can be selected through the various levels. Provision is also made for a signal having priority in a system of such repeaters.

16 Claims, 19 Drawing Figures

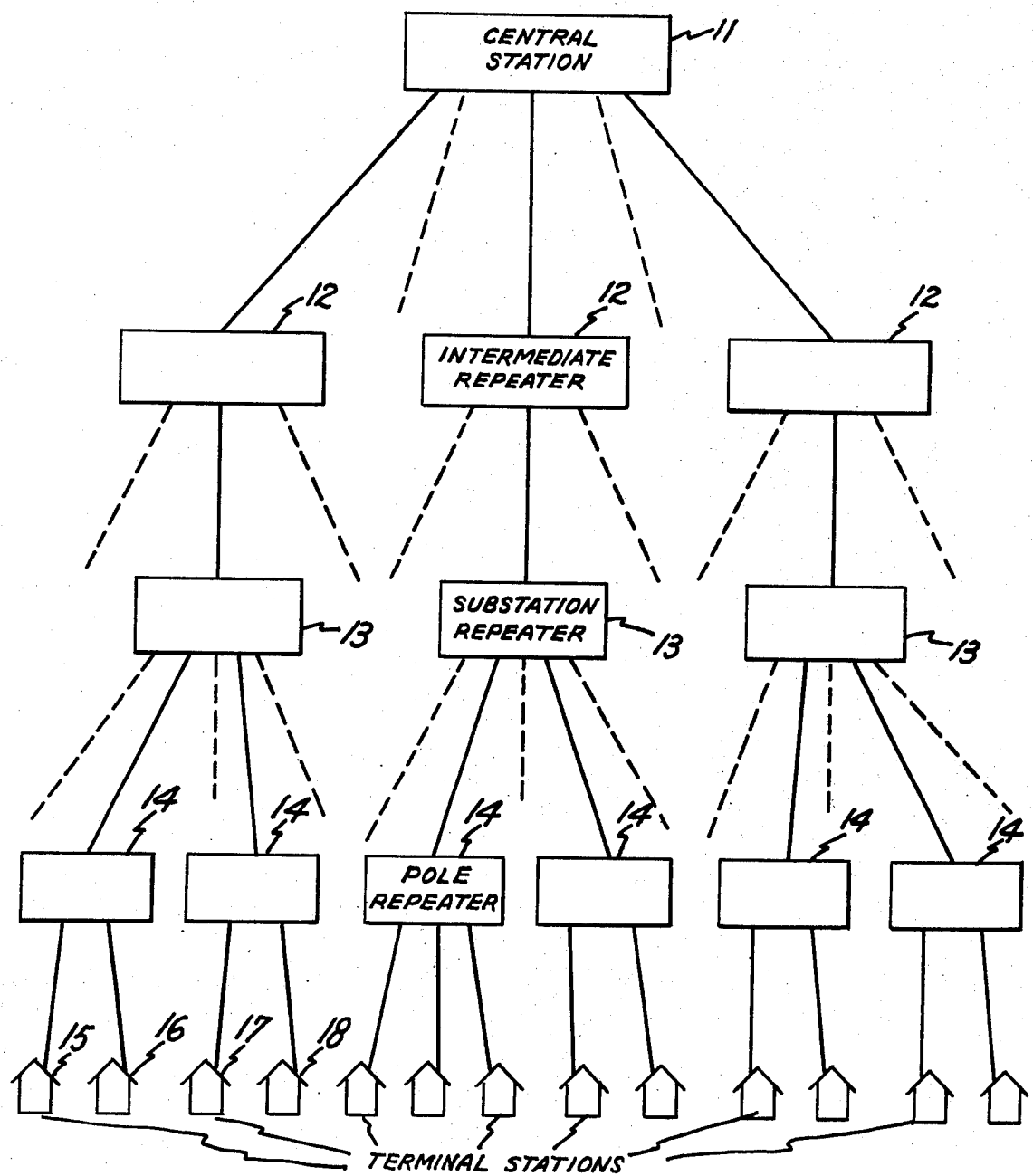

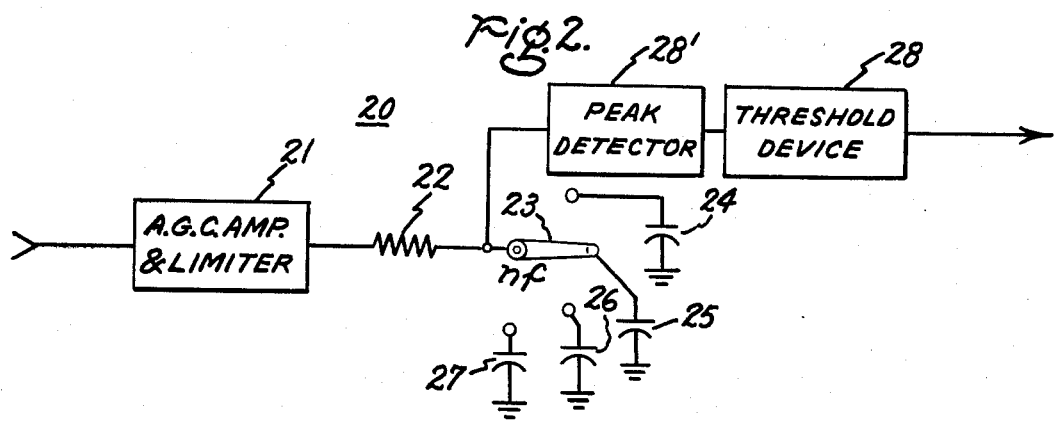
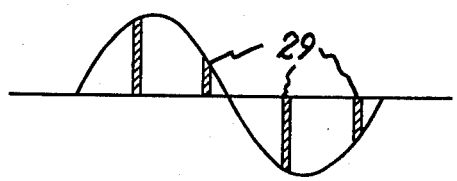
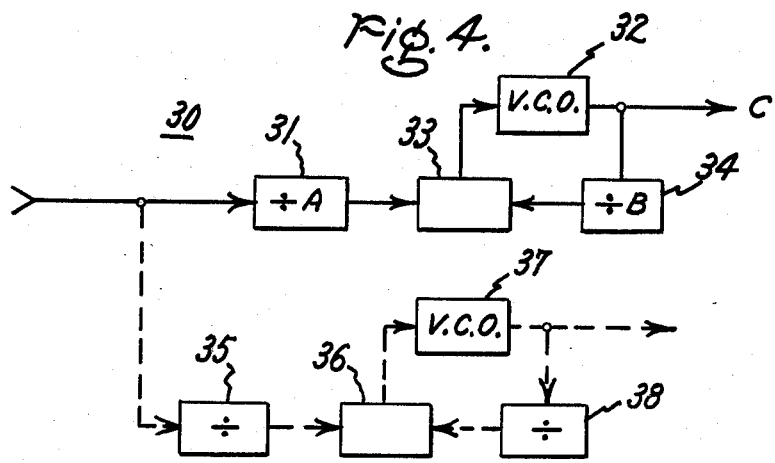

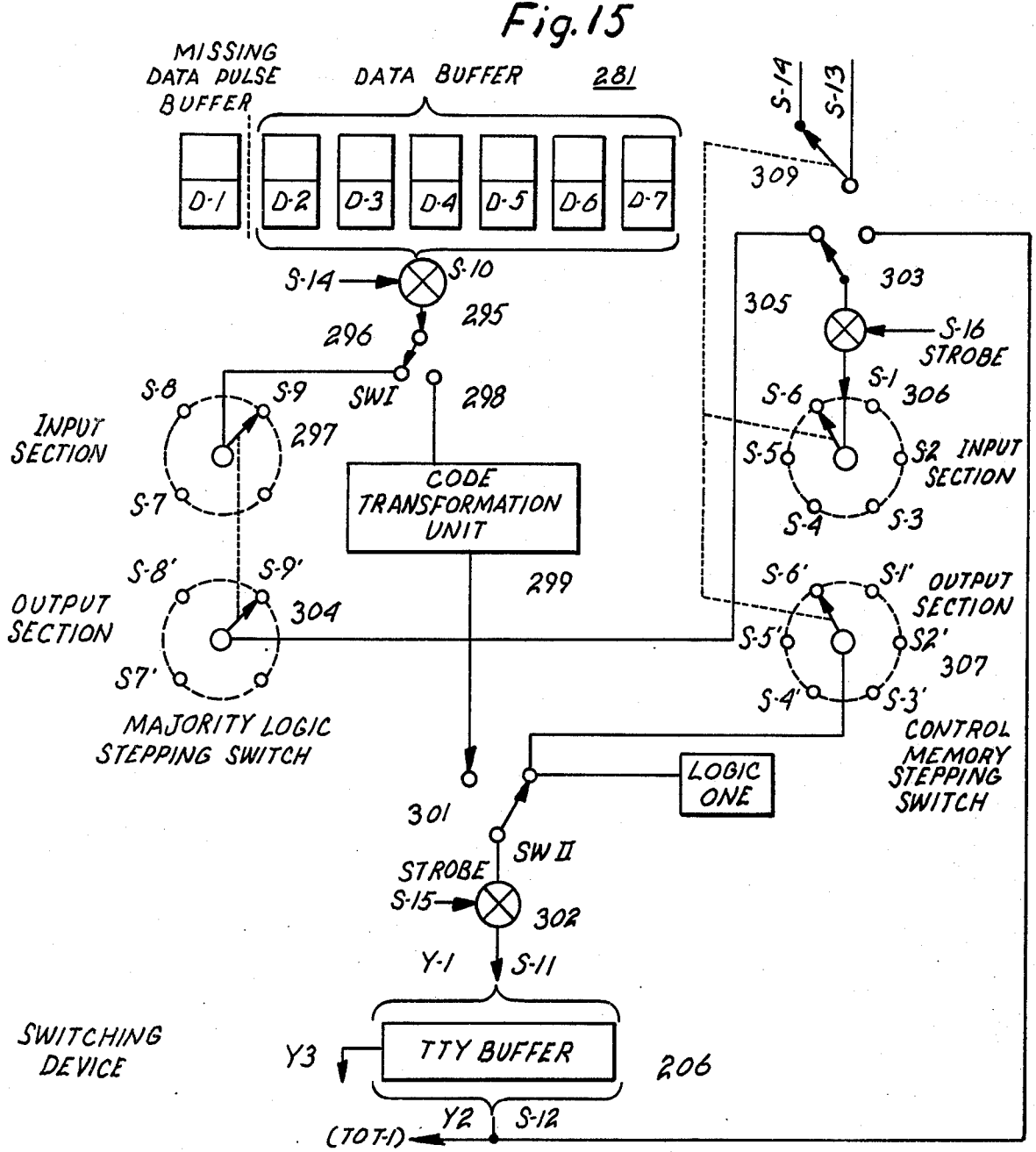
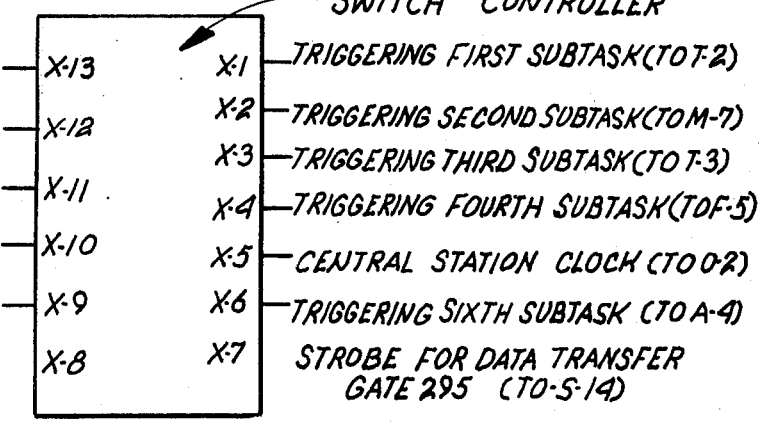

SIGNAL REPEATER FOR POWER LINE ACCESS DATA SYSTEM

TABLE OF CONTENTS

A. Background
  1. Introduction
  2. Related applications
  3. Field of the invention
  4. Prior art
B. Summary of the invention
  1. Objects
  2. Summary
  3. Brief description of drawings
C. Detailed description of the invention
  1. The general system
  2. Apparatus used throughout the system
    a. The tone receiver
    b. The tone generator
  3. The terminal station
  4. The repeaters
    a. The tone repeaters/translators
    b. The pole repeater
    c. Higher level repeaters
  5. The central station
    a. Generally
    b. The transceiver
    c. The decoding logic
  5. The central station (continued)
    d. The data handling unit
    e. The timing circuitry
    f. Operation
D. Conclusion
E. Claims

BACKGROUND

1. Introduction

This invention relates to data communication systems and more particularly to data communication system adapted for use on power lines for monitoring loads, providing load control, detecting and locating faults, providing transformer protection, automatic meter reading and two-way communications and the like.

2. Related Applications

This application relates to application serial numbers 529,998, 530,000 and 530,129 filed concurrently herewith by the present applicant and assigned to the assignee of the present invention.

3. Field of the Invention

Electrical power to individual residences and industrial users is generally provided in a local service area by a power company which receives its power from either a local generating station, a high voltage transmission tie-line, or both. The power company then distributes this power through a power distribution network originating from the power source and terminating at the user's location. Simplified, this distribution network comprises a tree-like structure that branches out from the source of power through several levels of distribution voltages and ultimately to a large number of users. (It is understood that power companies frequently provide additional interconnections at various voltage levels to form loops for improving the reliability of the service. For purposes of description, this complexity is ignored since it does not affect the operation of the present invention.) The generated power is distributed by step-down and distribution transformers. The transformers may be considered the nodes with each node receiving its power at a higher voltage level and delivering its power to one or more branches at a lower voltage level.

The distribution of electrical power in this manner requires a high degree of reliability to insure continuous service to the power users. The power company is therefore under a heavy burden of systematically monitoring the various loads, providing load control where necessary, detecting the existence of power outages and location of faults producing such outages. While some degree of automation has been utilized to meet these needs of the power company, monitoring and control of loads, as well as fault detection and numerous other functions encountered in power distribution are still primarily handled by company personnel assigned to perform these various tasks. Additionally, since power users are billed only for the power consumed, it is presently necessary to employ personnel for reading each of the watt-hour meters at the various customer locations. The performance of these various functions therefore necessitates a large number of specially skilled individuals. The costs of maintaining such skilled individuals is ultimately passed on to the consumer, thereby increasing his costs.

4. Prior Art

In the past, many attempts have been made to automate some or all of these functions and, possibly, to provide a two-way communication system as well. One possibility that has been considered is the use of telephone lines or other communication links independent of the power line distribution system. However, this approach is too costly for the benefits received. Alternatively, systems have been proposed utilizing the power line distribution system itself. These systems have proven unsatisfactory for several reasons. One reason is the noise on the line; for example, from motors, atmospheric noise (the line acts as an antenna), switching of loads, static, arcs, etc. Another reason is the impedance variations in the line itself, e.g., due to humidity changes, load variations, variations in height above ground and the like, as well as data transmission barriers in the form of impedance discontinuities caused by step-down and distribution transformers, and series and shunt capacitors to control power factor.

These and other difficulties combine to produce what may be considered a uniquely hostile environment in which to reliably transmit data. The result is that any automation of the meter reading function was usually limited to only one level in the power distribution system, e.g., from the pole repeater to the consumer, with other communication links to a central office. Further, two-way communication has been limited due to the number of transmission errors that may occur with systems of the prior art. Similarly, power line transmission systems of the prior art do not provide random access to the user locations.

SUMMARY OF THE INVENTION

1. Objects

In view of the foregoing, it is therefore an object of the present invention to provide a data communication system adapted to be used on a power line distribution network which provides random access capability from a central station to any terminal in the distribution network.

It is another object of this invention to provide a power line transmission network with a two-way transmission path uniquely established from a central office.

It is a further object of this invention to provide means for bridging transmission barriers in a power distribution network to establish a communication link between a terminal station and a central station.

It is another object of this invention to provide random access data collection through a common transmission medium.

It is a further object of the present invention to provide a relatively low cost data communication system adapted to be used on a power line distribution network.

2. Summary

The data communication system of the present invention is superimposed on the electric power distribution network and provides a two-way transmission path that is uniquely established between a central office and any particular point in the power distribution network. The two-way transmission path is provided through the common transmission medium of the electric power distribution network and selectively located repeaters which bridge the transmission barriers at tone frequencies imposed by various power distribution devices, such as transformers and power factor correction capacitors. In operation of the two-way data communications system of the present invention, command signals are sent to a selected location in the power distribution network and data signals responsive to the command signal are received back at the central station.

The two-way communications link is achieved with a repeater system comprising intermediate repeaters, substation repeaters and pole repeaters. The intermediate repeaters are selectively located between the central station and a power distribution substation. The substation repeater is located at the distribution substation and the pole repeaters are located at the distribution point in the system servicing one or more users. The two-way data communication system also comprises a terminal station for generating data signals when queried by the central station. The terminal stations are located at the user's location and upon interrogation, provide a data signal representative of data collected from various recording instruments, such as watt-hour meters, water and gas meters, temperature sensors or other instruments located at the user's location.

Selection of a particular terminal station for data collection purposes is obtained by transmitting a code from the central office as a sequence of three parts, in which each part may be a combination of two frequencies or tones out of 12 frequencies. Each level repeater, i.e., intermediate, substation, and pole, is assigned 12 frequencies, for example, so that a particular path through the tree-like network is selected by three successive two out is 12 frequency selections.

The terminal stations transmit their data by time division multiplexing, i.e., only one terminal station transmits its data at a time. The transmitted data signals from the various terminal stations are relayed by the same chain of repeaters, each adding its own identification tones to the data signal, so that the information received at the central station includes pole, substation, and intermediate repeater identification tones plus the data signals from the time division multiplexed terminal stations.

The foregoing sequence of operations may be utilized for remote meter reading, fault location along a transmission line, transformer protection, supervision and signal functions, load control, line protection, and numerous other two-way coded communications functions.

The data communication system of the present invention therefore provides a two-way transmission path uniquely established between a central station and any particular terminal station in the system. This random access capability provides the versatility and flexibility necessary to provide complete automatic operation of a local power distribution network.

3. Brief Description of Drawings Drawings

A more complete understanding of the present invention can be obtained by considering the following detailed description in connection with the accompanying drawings in which:

FIG. 1 illustrates a power distribution system with the communication system of the present invention superimposed thereon.

FIG. 2 illustrates a tone receiver suitable for use in the system of the present invention.

FIG. 3 illustrates the operation of the tone receiver.

FIG. 4 illustrates a tone generator suitable for use in the system of the present invention.

FIG. 5 illustrates the operation of the tone generator.

FIG. 15 illustrates the switching circuitry of the data handling unit.

Figure 16A:
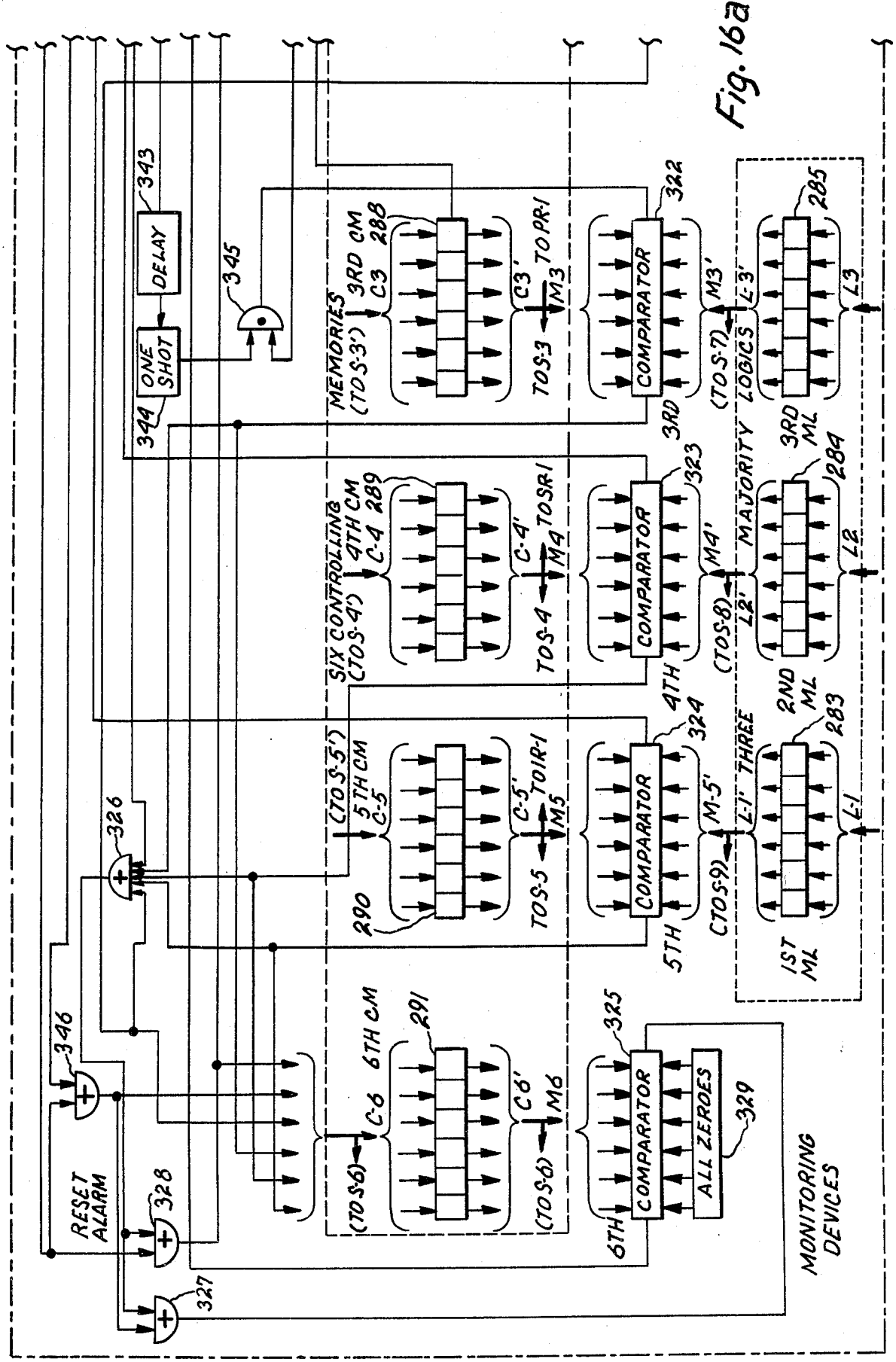
Figure 16B:
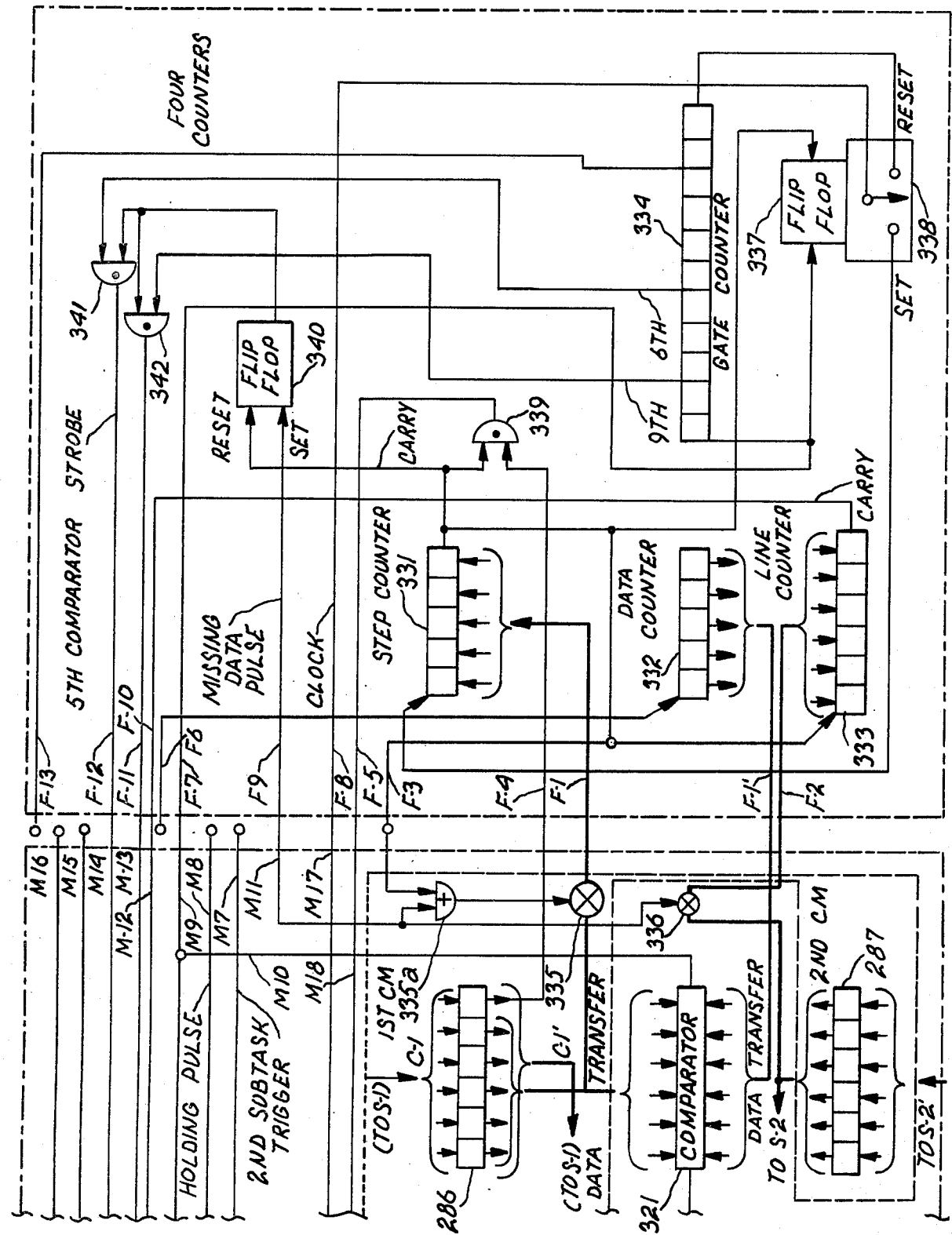

FIG. 16, consisting of connecting FIGS. 16a and 16b, illustrates the remainder of data handling unit.

Figure 17:
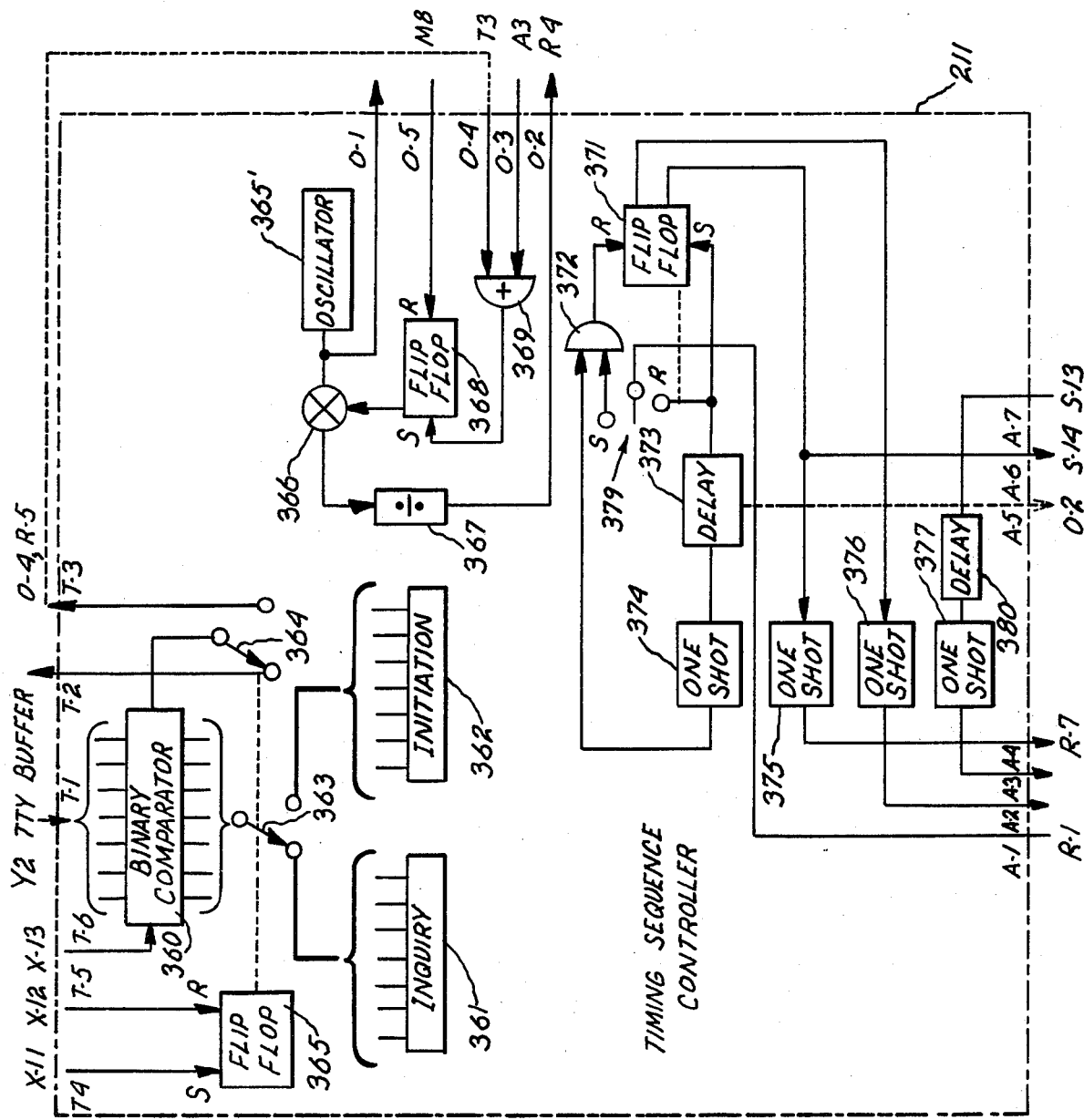

FIG. 17 illustrates the timing circuitry of the central station.

FIG. 18 illustrates the ancillary logic of the central station.

DETAILED DESCRIPTION OF THE INVENTION

1. The general system

FIG. 1 is a typical tree-like structure of an electric power distribution network in which electric power is generated or otherwise received from a high voltage transmission line at the central station. The electric power is distributed to electric power users via the usual transmission lines and step-down transformers located at the various nodal points illustrated in FIG. 1.

Superimposed on this power distribution network is the two-way data communications system of the present invention. At the various nodal points in the distribution network, a system of intermediate, substation and pole repeaters is employed for receiving command signals originating from the central station and retransmitting these signals to the next lower repeater in the network minus the identification of the preceding repeater. As used herein, "higher" and "lower" are relative to FIG. 1 and refer, respectively, to moving toward the central station and moving toward the terminal stations.

For example, a command signal originating from the central station 11 directed to a specific terminal station 15, for example, requires the selection of a specific chain of repeaters consisting of one intermediate repeater, one substation repeater and one pole repeater.

The command signal is a three-part signal with the parts transmitted seriatim. Each part is a six bit word, enabling 64 possible words, 64 being preferred for engineering considerations as the maximum number of possibilities. Each of the three parts is transmitted as a combination of two tones or frequencies out of 12 possible frequencies (2 out of 12 selections actually producing 66 possible combinations).

It is understood that the number and combinations of tones are a matter of routine engineering and that the specifics given herein are by way of example only. Other formats for data signalling may be used according to the particular need.

Each level repeater, i.e., intermediate, substation and pole repeater, is assigned 12 frequencies, so that a particular path through the network is selected by three successive 2 out of 12 frequency selections. Thus, the addressing code transmitted from the central station consists of six tones selected from 36 available tones. Since these tones are used for alerting a specific chain of repeaters, this address code is called the alert tones.

The first pair of alert tones turns on a particular one of the intermediate repeaters, 12, which in turn relays the remaining four tones to the substation repeaters 13 connected thereto. The second pair of alert tones turns on one of substation repeaters 13, which then relays the remaining two tones to pole repeaters 14 connected thereto. This last pair of alert tones turns on one of pole repeaters 14, thus completing a specific chain of repeaters between central station 11 and a particular pole repeater 14.

When pole repeater 14 is alerted, it sends out a pulse of single time duration, for example, at a particular frequency. This pulse alerts all terminal stations assigned to pole repeater 14, e.g., 15 and 16. The terminal stations then transmit their data, such as coded watt-hour meter readings, in a time-division multiplexing manner; that is, each terminal station transmits its data after a selected time delay from receipt of the alerting pulse. The manner in which this function is performed will be described more fully below.

The data transmitted from the terminal stations is received by pole repeater 14 and relayed to substation repeater 13. In a similar manner, the substation and intermediate repeaters relay the data signal. The signal received at central station 11 therefore includes three successive two out of 12 frequency selections which identify the intermediate, substation and pole repeaters transmitting the data and the data from the terminal stations in the selected time division multiplexing manner.

As more fully described herein, there is a short time interval in a repeater after it is activated before the data signals are received from lower level devices. In the two-way communication system described here, this time interval is used to transmit a signal in the data signal format for identifying the repeater activated, which is also relayed by higher level devices in the system, eventually reaching the data processing computer through the central station. This coded signal corresponds to the alert tones used in alerting that chain of repeaters. This code repeats several times in a specific pattern for identifying the activated repeaters. The pattern assures that the identifying codes for repeaters activated in three different levels for establishing the specific two-way transmission path are accurately received in the central station. Also, the identifying code pattern may be different when a repeater is used in different tasks in the system.

The repeater identifying codes are processed by majority logic in the central station for correction of normal transmission errors. Thus, the central data processing computer always has the correct repeater identification code associated with collected data. The particular terminal station that originates the data can be identified by the order of data's occurrence in the data sequence collected from a single, time multiplexed group.

After having alerted a particular intermediate and substation repeater, another pole repeater connected to the same node in the tree-like network may be alerted to collect data from the group of terminal stations connected thereto, e.g., 17 and 18. However, the system in accordance with the present invention provides random access, i.e., the same intermediate and substation repeaters need not be selected by the next alert tone from the central station. In this way, the watt-hour meter readings from various terminal stations may be collected in an organized way for subsequent billing purposes at the central station. Those skilled in the art can readily appreciate that from a data management point of view, it may be desirable to limit the total amount of data collected in such stepping operations. For example, it may be desirable to restrict each inquiry to 32 lines of data, i.e., from 32 different pole repeaters, so that, for 32 terminal stations per repeater, the data block corresponds to 1024 terminal stations.

In addition to providing automatic meter reading, the power line data communication system of the present invention is also capable of providing an alarm function at the central station whenever an emergency condition exists, in a terminal station for example. The alarm function is provided by a specific tone originating from a terminal station and relayed through the various levels of repeaters of the central station. The chain of repeaters that relay this alarm tone are turned on by the alarm tone and the relaying of any regular data collection signal, if any, is blocked whenever an alarm tone is sent. During this alarm function, the identity of the repeater chain involved in the alarm process is relayed to the central station. The central station can then query the particular group of terminal stations from which the alarm originated and cause data from this group to be sent to the central station. During this inquiry, the data of the alarming station is sent along with the alarm tone. This second transmission of the alarm tone identifies the alarming station by the time position of the alarm and data tones in the time multiplex signals from the pole repeater. The same coded data is used for repeater identification during an alarm, however, the pattern is slightly different. Specifically, an alarm code precedes the identification codes.

The alarm function may be used to provide indications of power outrage, overloaded transformers, unusual power demands from a particular terminal station or other emergency conditions as desired.

As more fully described herein, in connection with each repeater, the level to level frequency groups need not be the same. That is, the pole repeaters connected to a particular substation repeater may respond to combinations of tones, $a$, $b$, $c$, $d$ (taking just four tones for the sake of example). However, the substation repeater may generate the appropriate two of these tones in response to two of tones $e$, $f$, $g$ and $h$. In so doing, better isolation is obtained between the levels of the system.

This isolation can be provided at all levels of the system. For example, assume central station 11 sends out a combination of tones (selected from three groups of 2 out of 12) 1,2 - 3,4 - 5,6 corresponding to a particular path through the intermediate substation and pole repeaters. The intermediate repeater alerted by tones 1,2 would then transmit tones 7,8 - 9,10, corresponding to tones 3,4 - 5,6, respectively. The particular substation alerted by tones 7, 8 would then send out tones 11,12 instead of 5,6 or 9,10, respectively. The result is that each level is completely isolated from the next since each level has its own set of frequency groups.

As is apparent to those of skill in the art, various modifications may be made while still achieving the isolation of one level from the next. For example, alternate levels may have the same frequency groups.

2. Apparatus used throughout the system

In order to simplify the drawings illustrating in detailed block diagrams the terminal station, pole repeater, etc., two elements used extensively throughout the communication system of the present invention shall now be described in detail and later illustrated by a single block. The first of these elements is illustrated in FIG. 2 and comprises one embodiment of a tone receiver suitable for use in the present invention.

a. The tone receiver

Tone receiver 20 comprises an automatic gain control (A.G.C.) amplifier and limiter 21; a commutating filter comprising resistor 22, single pole-multiposition switch 23 and capacitors 24–27; peak detector 28'; and threshold device 28.

A.G.C. amplifier and limiter 21 serve to amplify the incoming signal to an approximately uniform level and also to clip any incoming signals exceeding a predetermined level. As previously indicated, a power line is an exceedingly noisy environment in which to communicate. A.G.C. amplifier and limiter 21 serve to exclude a certain amount of that noise from the receiver.

The commutating filter may best be understood in conjunction with FIG. 3, wherein a sinusoidal waveform is illustrated as having samples 29 taken at particular points in the waveform. The commutating filter operates on the basis that the theoretical average for noise (i.e., unwanted signals) is zero; that is, noise contains approximately equal positive and negative components. The commutating filter comprises an R.C. network wherein a resistor and a plurality of capacitors are connected by a multiposition switch. The switch changes position at a switching or commutation frequency equal to $n$ times the frequency of the desired incoming signal, where $n$ is an integer equal to the number of capacitors in the filter, so that the switch completes one rotation per cycle of incoming signal.

As switch 23 rotates, connecting resistor 22 to different ones of the capacitors, a series of samples is taken of the incoming signal. As can be readily appreciated, if the incoming signal has the same frequency as the rotation of switch 23, then samples 29 are taken at the same point in the waveform for several cycles of the incoming signal. Because the samples occur at approximately the same point on the waveform during each cycle of the incoming signal, charge will accumulate on at least some of filter capacitors 24–27. As switch 23 rotates, it also samples the voltage on capacitors 24–27 for peak detector 28'. Peak detector 28' couples the highest sample voltage to threshold device 28 which produces an output pulse when the threshold is exceeded, indicating a signal of the proper frequency has been received.

As can be appreciated by inspection of FIG. 2, the receiver is particularly adapted to receive signals in an exceedingly noisy environment. Specifically, the receiver comprises a three stage filter. The first stage removes noise exceeding a predetermined amplitude; the second stage is noise tolerant and frequency dependent in sampling the incoming signal at regular intervals and averaging the samples over a number of cycles; and the third stage, usually considered as an amplitude dependent device, becomes amplitude-dependent-at-a-certain-frequency due to the preceding filter. Thus, the combination of seemingly simple and inexpensive elements produces an economical, narrowband, noise tolerant receiver for the data transmission system herein described.

The bandwidth of receiver 20 is inversely proportional to the R-C time constant of resistor 22 and the sum of capacitors 24–27. In a system actually constructed, series or cascade connected commutating filters having different time constants are used to broaden the response curve so that less expensive (less stable) crystal oscillators can be used. In the receiver built the time constants are 0.05 and 0.15 seconds corresponding to bandwidths of 20.00 and 6.67 hz., respectively. This combination of filters produces a receiver having a nominal bandwidth of 7 hz.

The number of positions of switch 23 is not critical, although at least three positions are necessary. A practical range for the number of positions is from 3 to 12.

The center frequency of the commutating filter is determined by the commutation frequency applied to switch 23. Only a signal received in synchronism with switch 23 will produce a signal on capacitors 24–27 that does not average zero over a predetermined number of cycles of the incoming signal. Thus, receiver 20 may be utilized to receive any incoming signal throughout the data communication system of the present invention. The only change needed to receive different tones is that the commutation frequency be changed to $n$ times the frequency of the desired signal. The commutation signal may be readily derived from a local clock signal by suitable division.

Receiver 20 as illustrated in FIG. 2 includes a mechanical form of commutating filter. In actual practice the commutating filter may be implemented by discrete semiconductor devices or integrated circuit devices performing the same function as rotating switch 23. For example, a plurality of sampling circuits can be sequentially activated by a ring counter. This type of operation is well known per se in the art. Also, while illustrated by capacitors 24–27, the filtering or averaging portion of receiver 20 may comprise $\pi$-network low-pass filters or other suitable filters. Further information on the operation of the commutating filter can be obtained from LePage, Cahn, Brown; Analysis of a Comb Filter Using Synchronously Commutated Capacitors; A.I.E.E. Transactions; Part I, p.p. 63–68, 1953.

b. The tone generator

FIG. 4 illustrates one embodiment of a data tone generator suitable for use in the present invention. Data tone generator 30 comprises divider 31 having input thereof connected to a local clock frequency, a voltage controlled oscillator 32 whose frequency is to be locked to, and a sub-multiple of, the local clock frequency. The output of voltage controlled oscillator 32 is locked to the local clock signals by way of phase comparator 33 and a second divider 34.

The operation of data tone generator 30 is analogous to that of a transfer oscillator, as used for frequency measurements. Specifically, incoming signals from the clock source are divided by divider 31 to a lower frequency. The output signal from voltage controlled oscillator 32 is reduced to a lower frequency by divider 34. The output signals from dividers 31 and 34 are compared in phase comparator 33, which produces an output voltage for controlling voltage controlled oscillator 32 in the well-known phase locked loop. Tone generator 30 produces an output signal at a frequency, C, equal to B/A times the incoming clock signal. The output signal from voltage controlled oscillator 32 is thus a fixed submultiple of the clock signal and is phase locked to the clock signal.

As further illustrated in FIG. 4, tone generator 30 may comprise a plurality of similar oscillators; for example, elements 35–38 corresponding respectively to elements 31–34. The input of each oscillator is connected to the local source of clock signals. In this manner a plurality of tones can be readily generated.

As previously noted, a plurality of tones is utilized in the selection of a particular path through the tree-like network of the power distribution system. While a plurality of tone generators, one for each tone to be generated, can be utilized to implement the present invention, the equipment necessary can be greatly simplified by using logic control circuitry to vary the division ratios of dividers 31 and 34. In this regard, FIG. 5 illustrates a plurality of combinations of division ratios for oscillators 31 and 34 as well as the resulting output signals. As can be readily appreciated, varying the division ratio of divider 34 produces different frequencies from voltage controlled oscillator 32. If the division ratio of oscillator 31 is also changed, different families or sets of spaced frequencies are produced by voltage controlled oscillator 32. Different sets of tones are determined by divider 31, while the specific member of the set is determined by divider 34.

Varying the division ratio of a divider is well known per se in the art and may comprise varying the feedback connections within the divider/counter to provide different division ratios. The logic involved in varying the division ratio of a counter in response to an encoded input signal may simply comprise a switching matrix for converting the encoded data to a plurality of feedback paths, thereby determining the division ratio of the particular counter.

Thus, only six oscillators are needed to produce the three sets of two out of 12 tones noted previously, as opposed to the 36 separate oscillators as would be needed if fixed frequency oscillators were used.

A further economy of parts is obtained since the same apparatus can be used throughout the data communication system of the present invention, i.e., it is less expensive to make 10,000 identical oscillators than 100 of each of 100 different oscillators. Similarly, receiver 20, illustrated in FIG. 2, can be identical throughout the data communication system of the present invention. There is thus achieved by the present invention a simplicity and economy of apparatus that enables the present invention to be implemented in integrated circuit technology at relatively low cost.

While a preferred receiver and tone generator have been shown and described, it is understood that various other circuits suitable for use as receivers or tone generators can be utilized.

3. The terminal station

Figure 6:
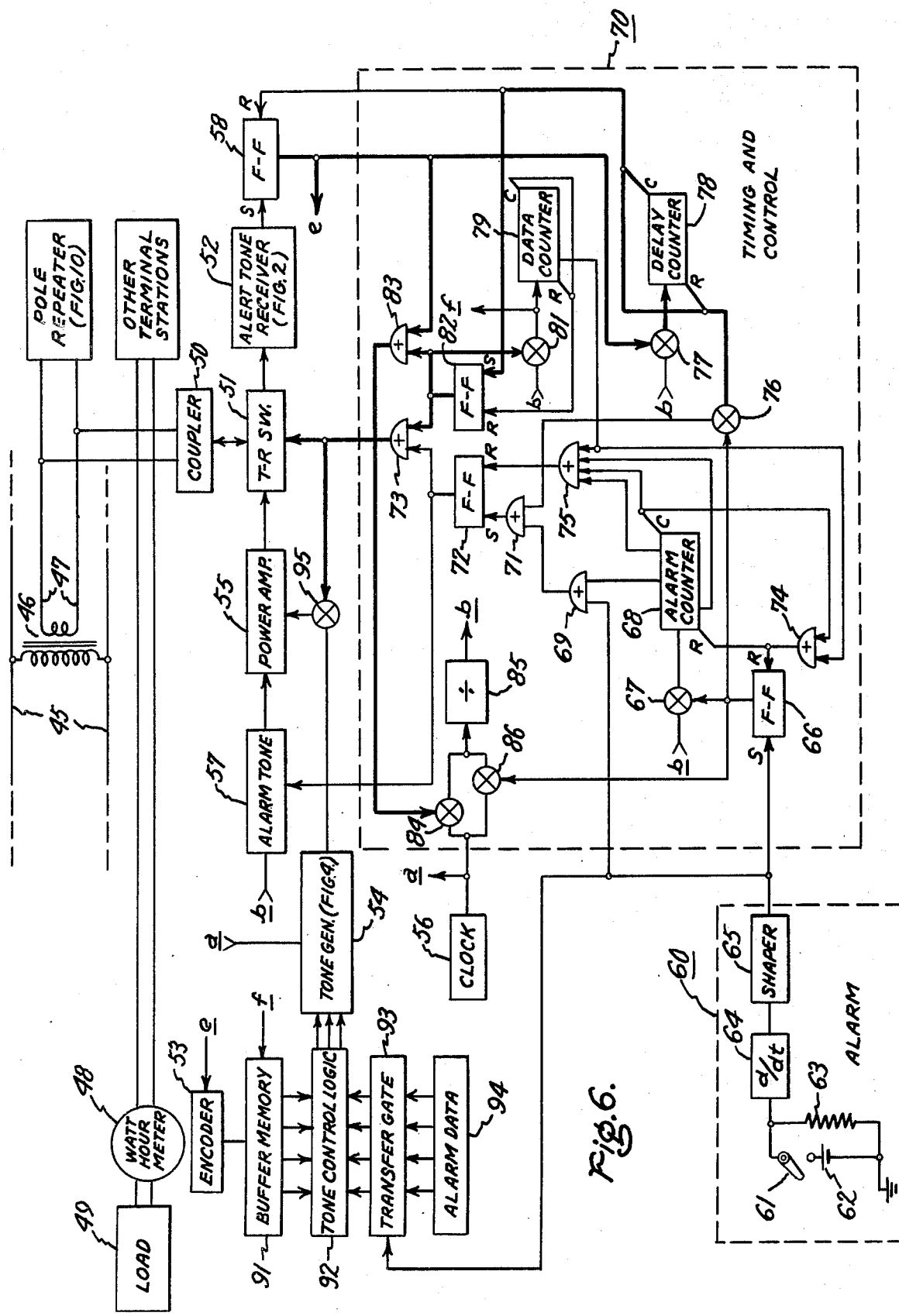
FIG. 6 illustrates a terminal station.
Figure 7:
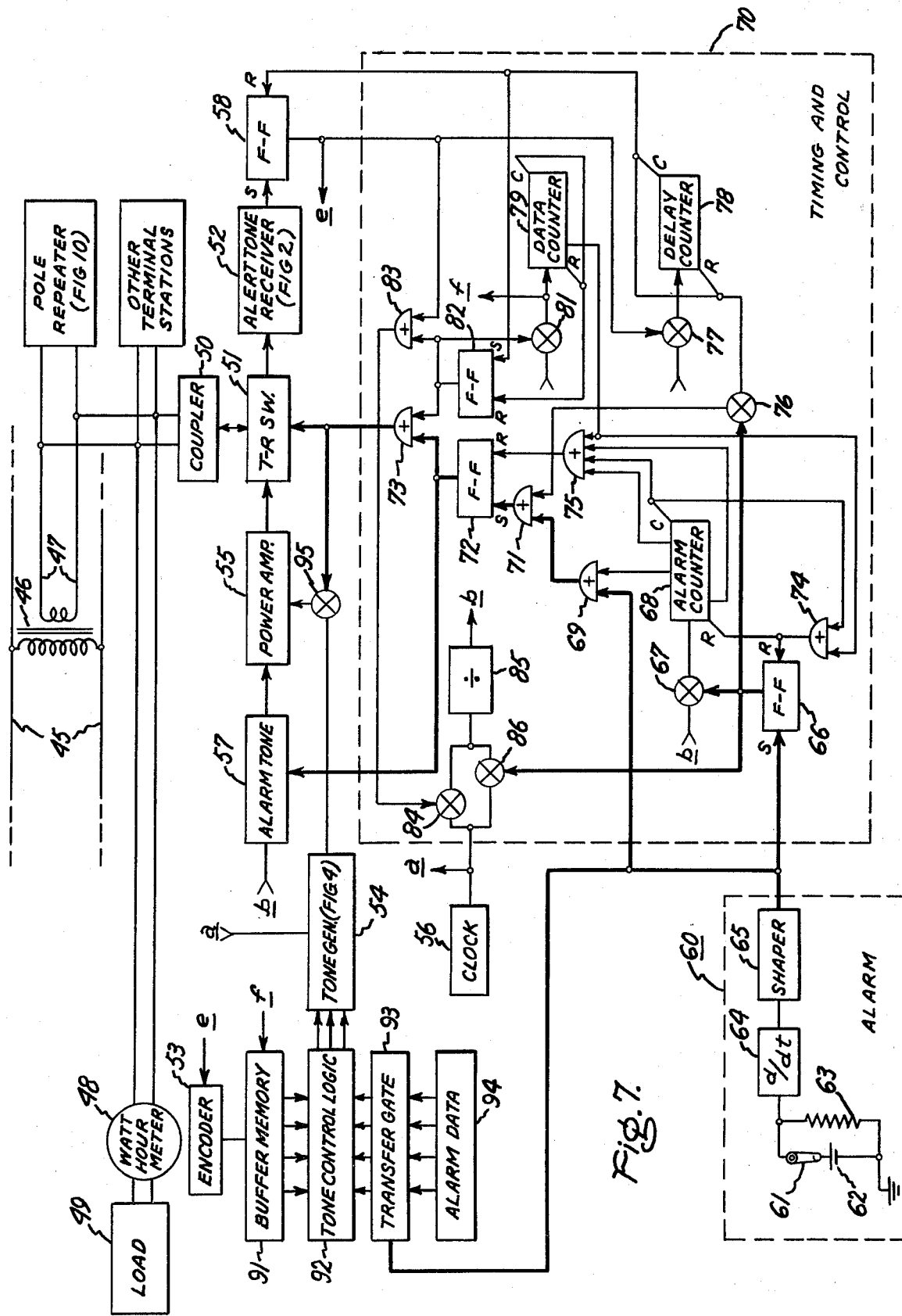
FIG. 7 illustrates a terminal station transmitting an alarm.

FIGS. 6 and 7 illustrate a terminal station for use in the data communication system of the present invention. The terminal station is typically located at the user's location, such as the residence of a power company subscriber. Typically, high voltage lines 45 are coupled to the user's residence by way of a distribution transformer 46 and service lines 47. At each user location, watt-hour meter 48 monitors the amount of power consumed by all of the various electrical equipment at the user location, collectively illustrated by load 49.

The pole repeater of the present invention is illustrated as connected to service line 47, typically 200 volts. Depending upon the frequency band utilized for the tones, the pole repeater may be coupled on the other side of distribution transformer 46. Specifically, for tones greater than approximaterly 15 Khz. the pole repeater is preferably connected to the primary of distribution transformer 46, usually in the range of 4 KV to 35 KV depending upon whether the service is urban or rural. For tones less than approximately 15 Khz., the pole repeater is connected as shown.

This choice of connection is due to the loss the higher frequency tone signals suffer in passing through a distribution transformer, on the order of approximately 20 db. The total loss between transmitter and receiver is the combination of two factors: the insertion loss of the transmission path, and the power absorbed by loads shunted on the distribution line. The high insertion loss of distribution transformer will increase the loss due to the first factor, but it also effectively isolates most of the loads except those that share the same distribution transformer with the terminal station in question, and greatly reduce the loss due to the second factor. Since there is a single distribution transformer between a pole repeater and a terminal station, coupling the pole repeater to the high voltage side of the distribution transformer at high tone frequencies will not significantly increase the transmission loss between the terminal station and the pole repeater. Furthermore, at higher frequencies, the noise level of high voltage lines is somewhat lower, thus off-setting the signal loss through the distribution transformer.

As described above, the terminal station receives command signals from the central station by way of the pole repeater and responds with data indicative of a recording instrument, such as a watt-hour meter. The transmitted data is in the form of discrete frequencies or tones which are preferably harmonics of 30 Hertz. For example, assuming the terminal station is provided with 12 discrete tones or frequencies for transmitting data, these frequencies may comprise the range of 8070 – 8730 Hertz, which corresponds to the 269th – 291st harmonics of 30 Hertz. These 12 tones are then utilized to provide a coded signal representative of the watt-hour meter reading. The selected tones are transmitted from the terminal station and relayed by the pole and other repeaters back to the central station.

The terminal station is connected to service line 47 by way of coupler 50 which may, for example, comprise a toroid through which one line of the service line passes as the primary of a transformer. The secondary winding of the transformer may comprise several turns of wire which may be resonated at the range of frequencies or tones transmitted by the terminal station. The secondary winding of coupler 50 is connected to a transmit-receive (T-R) switch 51 which may, for example, comprise a simple single-pole double throw relay or a suitable semiconductor equivalent. In the unactivated condition, T-R switch 51 normally connects coupler 50 to alert tone receiver 52.

When an alert tone is received by alert tone receiver 52, encoder 53 is activated to encode the reading of watt-hour meter 48 into a suitable form, such as binary or binary coded decimal, for controlling the tones generated by tone generator 54. The output of tone generator 54 is amplified by power amplifier 55 and transmitted by way of T-R switch and coupler 50 to the pole repeater. Clock 56 is a master oscillator continuously running at a high multiple of the local clock pulse rate used for local clock signals $b$ for tone generator 54 and alert tone receiver 52.

Should an alarm situation develop at the user location, alarm tone generator 57 provides a unique signal which is amplified by power amplifier 55 and transmitted to the pole repeater by way of T-R switch 51 and coupler 50, regardless of the other operations being carried out at the time, and also independently of whether or not the particular pole repeater has been activated. Thus, an alarm condition is immediately communicated to the central station even if that particular pole repeater and terminal station were not being interrogated at the time.

Receive tone flip-flop 58 is put in the set condition by an output signal from alert tone receiver 52. Receive tone flip-flop 58 temporarily stores the received pulse, activates the encoder, and establishes initial timing conditions within the terminal station when alerted. The overall timing and control of the terminal station is accomplished by timing and control circuit 70 which has inputs connected to clock source 56, flip-flop 58 and alarm circuit 60. The outputs from timing and control circuit 70 control T-R switch 51, alarm tone generator 57, the reset of flip-flop 58, and the application of the data tone signal to power amplifier 55 by way of gate 95.

Alarm generator 60 comprises a physical swtich 61 which may be actuated by any type of alarm situation such as a local power outrage, fire, etc. Battery 62 and resistor 63 are connected as shown to switch 61 to provide a single pulse having a duration equal to the time switch 61 is closed. This pulse is differentiated by differentiator 64 and suitably shaped by pulse shaper 65 which may, for example, comprise a monostable multivibrator. Thus the output from alarm circuit 60 is a single pulse, i.e., one pulse for each actuation of switch 61. It is understood that switch 61 is representative of whatever sense apparatus is used to detect alarm conditions.

As more fully described below, timing and control circuit 70, in response to an alarm pulse, causes the transmission of an alarm tone followed by a waiting period for a response from the pole repeater. If no response is obtained, the transmission of the alarm tone followed by a pause is repeated a fixed number of times as determined by timing and control circuit 70. Since the alarm tone has priority throughout the entire data communication system of the present invention, if an unanswered alarm were permitted to continue indefinitely, data communication would be effectively stopped by a single alarm. Thus, after a fixed number of tries, an alarm signal from a terminal station is ignored unless alarm switch 61 is opened and closed again.

An alarm is answered by an alert tone from the pole repeater to which the terminal station responds by transmitting its alarm data along with the alarm tone. This information is then relayed to the central station which identifies the particular terminal station by the repeater codes plus the timing of the alarm signal. As previously noted, the terminal stations transmit their data to the pole repeater in time division multiplex format. Thus, the initial alarm tone, which overrides other communications, merely tells the data processing computer which pole repeater has an alarming terminal station. In order to identify the particular terminal station, the data processing computer causes an alert tone to be transmitted by the central station through the repeaters to alert the right group of terminal stations, causing the terminal stations to send their data in time sequence. The identity of the alarming station is thus indicated by the data tones being accompanied by an alarm tone.

Timing and control circuit 70 comprises an alarm flip-flop 66 having the set input thereof connected to the output of alarm circuit 60. The output of flip-flop 66 is coupled to the control input of switch 67 which may comprise any suitable controlled switch, for example, an AND circuit for digital signals. The control input for the controllable switches is indicated by an arrowhead, whereas the controlled input does not have an arrowhead. The controlled input to switch 67 comprises $b$ clock pulses derived from clock source 56. These clock pulses are counted in alarm counter 67 having, in addition to a "carry" output and "reset" input, taps connected thereto for controlling the timing of the alarm tone from the terminal station. One tap from alarm counter 68 is coupled by way of OR gate 69 to OR gate 71 and flip-flop 72. The other input to OR gate 69 is connected to the output of pulse shaper 65. The second input to OR gate 71 is connected to the output of control switch 76. The output of flip-flop 72 is coupled to one input of OR gate 73 and to the controlled input of alarm tone generator 57. The output of OR gate 73 controls T-R switch 51 and, specifically, sets T-R switch 51 into the transmit mode. In the absence of a pulse from OR gate 73, T-R switch 51 is normally in the receive mode.

The "carry" output from alarm counter 68 is coupled as one input to OR gate 74. The output of OR gate 74 is connected to the reset inputs of flip-flop 66 and alarm counter 68. The second input to OR gate 74 is coupled to a tap on data counter 79. The same tap from data counter 79 is connected as one input to OR gate 75, which has another input thereof connected to a second tap on alarm counter 68 and a third input connected to the "carry" output of alarm counter 68. The output of OR gate 75 is connected to the "reset" input of flip-flop 72.

Controlled switch 76 has the control input thereof connected to the output of flip-flop 66 and the output thereof connected to OR gate 71. The controlled input to switch 76 is connected to the "carry" and "reset" terminals of delay counter 78. Delay counter 78 has the input thereof connected by way of controlled switch 77 to a source of $b$ clock pulses. The control input to switch 77 is connected to the output of alert tone receive flip-flop 58.

Data counter 79 has the input thereof connected to a source of $b$ clock signals by way of control led switch 81, which has the control input thereof connected to the output of flip-flop 82. The output of flip-flop 82 is also connected as one input to each of OR gates 73 and 83. The output of OR gate 83 is connected to the controlled input of switch 84.

Switch 84 comprises one path by which clock signals from clock source 56 can reach divider 85, the output of which comprises the $b$ clock signals. The other path by which clock pulses from source 56 can reach divider 85 is by way of controlled switch 86 having the control input thereof connected to the output of flip-flop 66. Thus, clock source 56 runs continuously, providing a continuous series of $a$ clock pulses and a switched series of $b$ pulses from divider 85. The $b$ clock pulses are produced when an alert tone is received (by way of switch 84), or by way of switch 86 (when an alarm is sounding). The initial timing of local clock pulses $b$ is determined by the first closing of switch 84 or switch 86. Continuous clock pulses $a$ are provided to tone generator 54 and alert tone receiver 52.

In response to an alert tone, encoder 53 is activated to encode the meter reading on watt-hour meter 48 into binary form which is then stored in buffer memory 91. Encoder 53 may comprise any suitable encoder and may, for example, comprise the encoder described in copending patent application Ser. No. 348,745, filed Apr. 6, 1973, and assigned to the assignee of the present invention. The clock input to buffer memory 91 is connected to the output of controlled switch 81, the connection illustrated by the letter $f$. The information stored in buffer memory 91 is read out under the control of clock signals $f$ to the inputs of tone control logic 92 which, as previously described controls the data tones generated by tone generator 54.

If desired, the alarm function may be utilized to provide an indication of more than one alarm situation. In this case, transfer gate 93 couples alarm data code signals from alarm data circuit 94 to tone control logic 92. Alarm data circuit 94 produces a unique output code, depending upon the nature of the alarm. Alarm switch 61 may thus comprise many single pole switches in which one switch is utilized in alarm circuit 60 to indicate that a particular alarm situation exists, and other switches would be used in conjunction with a different alarm. Different alarm data codes stored in alarm data circuit 94 would then indicate which type of alarm situation exists. In addition, an alarm signal may be repeated if desired.

As can be seen by inspection, FIGS. 6 and 7 illustrate the same circuit with the exception that in FIG. 6 alarm switch 61 is open, whereas in FIG. 7 alarm switch 61 is closed. The overall operation of a terminal station in accordance with the present invention will be described in several parts. The first part dealing with the reception of an alert tone is illustrated in FIG. 6 by the more heavily lined interconnections. A second part, dealing with the alarm function, will be described in conjunction with FIG. 7 wherein the signal lines actuated during an alarm condition are heavier than those of the remainder of the circuit. It will be appreciated that the more heavily lined interconnections of FIGS. 6 and 7 represent initial conditions, i.e., the start of the particular cycle.

In connection with FIG. 6, an alert tone is received and data is transmitted by the terminal station as follows: the pole repeater, as described more fully hereafter, receives a coded signal from the next higher repeater. This signal is decoded by the pole repeater and is responded to by the production of an alert tone by the pole repeater. This alert tone on service line 47 is coupled to all terminal stations connected to that service line. In addition, it also passes through distribution transformer 46 to high voltage distribution line 45. Thus, the alert tone will eventually reach many other terminal stations connected to other distribution transformers proximate transformer 46. Due to frequency allocations and attenuation on the lines, only the proper terminal stations will respond.

In the terminal station illustrated in FIG. 6, coupler 50 couples this tone to transmit receive switch 51, which is in the receive position. The received tone is applied to alert tone receiver 52 and decoded as described in connection with FIG. 2. The output pulse from alert tone receiver 52 is applied to the set input of receive flip-flop 58. Receive flip-flop 58 produces an output pulse signal that is applied to encoder 53 to initiate a meter reading which is suitably encoded and stored in buffer memory 91.

The output of flip-flop 58 also actuates switch 84 by way of oR gate 83 to cause the production of $b$ clock pulse signals from divider 85. The output of flip-flop 58 also actuates switch 77 coupling the clock pulse signals from $b$ to delay counter 78. Delay counter 78 provides a different amount of delay for each terminal station connected to the same pole repeater. At the end of the predetermined delay, delay counter 78 produces a "carry" output pulse which resets flip-flop 58 and sets flip-flop 82. The output of flip-flop 82 is coupled by way of OR gate 83 to switch 84 to maintain the production of $b$ clock pulses. The output of flip-flop 82 is also coupled by way of OR gate 73 to T-R switch 51, placing it in the transmit mode. Flip-flop 82 also actuates switch 81, providing $b$ clock pulse signals to data counter 79 and to buffer memory 91. These clock pulse signals cause buffer memory 91 to read out into tone control logic 92 which, in turn, controls tone generator 54, thereby producing a tone code output signal which is coupled by way of switch 95 to power amplifier 55. Controlled switch 95 is actuated by flip-flop 82 by way of OR gate 73. Power amplifier 55 amplifies the data tones generated seriatim by tone generator 54 and applied these amplified tones to T-R switch 51 which couples them by way of coupler 50 to service line 47 and the pole repeater.

During this time, data counter 79 counts $b$ clock pulse signals. At the end of the period determined by the count capacity of data counter 79, an output pulse is produced on the "carry" output line which resets data counter 79 and flip-flop 82. The time delay introduced by data counter 79 is sufficient for the information stored in buffer memory 91 to be completely read out and converted into a series of data tones by tone generator 54. Upon resetting flip-flop 82, switch 84 is opened, thereby terminating the $b$ clock pulses, T-R switch 51 reverts to the receive mode, and switch 95 is opened thereby disconnecting tone generator 54 from power amplifier 55. The system has thus completely reset and is ready to receive another alert tone from the pole repeater.

FIG. 7 illustrates the alarm operation of a terminal station in accordance with the present invention. During the alarm mode as previously indicated, there are a number of combinations of events that can take place. The usual sequence of events is that alarm circuit 60 will be actuated, causing an alarm tone to be transmitted by the terminal station. The terminal station then waits a predetermined period for an answer from the pole repeater. The pole repeater will answer with an alert tone thereby causing the terminal station to repeat the alarm tone and accompany the alarm tone with data tones. The data tones, while controlled by control logic 82, comprise alarm data from memory 94 since transfer gate 93 is activated by an output pulse from shaper 65 when alarm switch 61 is closed. Provision is also made, however, for the possibility that the pole repeater will not answer. In this event, the terminal station repeats the alarm signal and again waits for an answer. If the pole repeater responds with an alert tone, the terminal station then transmits the alarm tone with the data from alarm data memory 94. However, if there is still no answer the cycle continues a predetermined number of times after which the terminal station simply shuts off and ignores the actuation of alarm circuit 60. However, the alarm function is so designed that the alarm cycle is repeated for each separate actuation of switch 61, i.e., if switch 61 is opened and then closed again, the alarm cycle will be repeated.

Specifically, the closure of switch 61 applies a fixed amplitude pulse to differentiator 64 which differentiates the signal and applies the resulting spike to pulse shaper 65, which may, for example, comprise a monostable multiivibrator. The output from pulse shaper 65 is applied to the set input of flip-flop 66, which serves to store the alarm signal. The output from pulse shaper 65 is also applied to OR gate 69 and is coupled by OR gate 69 and OR gate 71 to the set input of flip-flop 72. Flip-flop 72, in turn, actuates alarm tone generator 57 and, by way of OR gate 73, T-R switch 51. Thus, an alarm tone is generated and is transmitted by the terminal station to the pole repeater.

The output of flip-flop 66 is also coupled to the control input of switch 67, closing the switch to couple $b$ clock pulse signals to alarm counter 68. Alarm counter 68 has at least two taps thereon to control the repetition period and duration of the alarm signal. As counter 68 counts the $b$ clock pulse signals, the first tap encountered (going from left to right) is the tap indicated as coming out of the lower portion of block 68, which is coupled by way of OR gate 75 to the reset input of flip-flop 72. Thus, after a predetermined duration of the alarm tone, the alarm is shut off and T-R switch 51 reverts to the receive mode. During the time period determined by the spacing of the first tap and the second tap on alarm counter 68, the terminal station waits for a response from the pole repeater. The duration of this waiting period is such that if the pole repeater were going to answer at all, it would have answered in this period, i.e., the duration of the waiting period exceeds the sum of the equipment delays of the various elements in the terminal station and in the pole repeater.

At the end of the waiting period, as determined by a second tap, illustrated as coming out of the upper portion of block 68, a pulse is produced that is coupled by way of OR gates 69 and 71 to the set input of flip-flop 72. As previously described, the output of flip-flop 72 causes an alarm tone to be generated by alarm tone generator 57 and transmitted by way of T-R switch 51 to the pole repeater. At the end of the transmission period, determined by the count capacity between the second and third taps on alarm counter 68 an output pulse is produced on the third tap and coupled by way of OR gate 75 to the reset input of flip-flop 72, thus terminating the second alarm pulse and initiating a second waiting period. At the end of the second waiting period, determined by the count capacity between the third tap and the "carry" output, a "carry" pulse is produced which is coupled by way of OR gate 74 to the reset inputs of flip-flop 66 and counter 68. This terminates the alarm function even though no response has been received from the pole repeater. If an alert tone is received from the pole repeater after the termination of the alarm function, there is no alarm tone transmitted, even though switch 61 is still in the closed position. The response of the terminal station is a normal data transmission.

While illustrated in FIG. 7 as containing only three taps, obviously counter 68 may comprise any desired number of taps to provide the desired number of transmit-and-wait cycles. Also, as described, counter 68 acts as a multiple tap delay line. It is understood that, depending upon the counting pattern and the use of additional logic circuitry, a greater or lesser number of taps may be used to provide the same number of transmit-and-wait cycles.

If, during waiting periods determined by the count capacity between the taps on counter 68 and the frequency of the $b$ clock pulses, an alert tone is received, then a data read out proceeds as described in connection with FIG. 6 with the addition of an accompanying alarm tone as determined by data counter 79. Specifically, after delay counter 78 determines the appropriate time for transmission, an output on the "carry" line of counter 78 sets flip-flop 82 which in turn causes $b$ clock pulse signals to be applied by way of switch 81 to data counter 79. The "carry" output of delay counter 78 is coupled by way of switch 76 and OR gate 71 to the set input of flip-flop 72. Switch 76 is in a closed condition due to the set output of flip-flop 66. This causes the transmission of an alarm tone by alarm tone generator 57, power amplifier 55 and T-R switch 51.

At the end of an initial transmission period, determined by the tap on data counter 79, a pulse is produced on the tap of data counter 79 which is coupled by way of OR gate 75 to the reset input of flip-flop 72, thereby terminating the transmission of the alarm tone. The pulse on tap of data counter 79 is also coupled by way of OR gate 74 to the reset inputs of flip-flop 66 and counter 68, thereby clearing the alarm circuit. Data counter 79 counts $b$ clock pulses for a time period sufficient to transmit data tones controlled by alarm data buffer memory 94 as previously described in connection with FIG. 6.

If desired, the alarm function need not have priority in the communication system of the present invention. This may be desirable, for example, where a plurality of alarm functions at each terminal station are provided and included in alarm data memory 94 as several different codes, each for a different alarm condition. Having a plurality of alarm functions available to a terminal station increases the probability of an alarm sounding during the basic data collection operation of the communication system of the present invention. However, although some interruptions may occur, the relatively low duty factor of the function, compared to total system time makes the occurrence of an interruption relatively rare. Further, even if an interruption does occur, and some data is lost, the random access capability of the system allows the meters to be re-read.

Only when the system is devoted to high duty factor tasks may the interruptions become intolerable; for example, with power demand meters, where every demand meter needs periodic reading, with a period of less than 1 hour. Under these circumstances, an alternative reading format may be used; viz., all of the alarm functions, except the most urgent one, are given a non-priority status. For example, much maintenance work requiring a field check by utility personnel does not require instantaneous attention in a two-way communication system. The non-priority alarms are read as part of the routine meter reading task.

This change in format slightly changes the construction of the terminal station. Specifically, instead of sending either meter data or alarm data, both are sent and the time allowed for each meter to respond must be increased, which is accomplished by changing the count capacities of counters 78 and 79. An additional tap is added to data counter 79 to actuate an additional data transfer gate which connects an added alarm buffer memory to tone control logic 92. The inputs to the alarm buffer memory is connected to added alarm data memories, actuated by additional alarm circuits, similar to circuit 60 but more simple, e.g., omitting differentiator 64 and shaper 65. In essence, a plurality of alarm circuits are provided in parallel, only one has direct access to a transfer control gate, the other transfer gate is actuated by the data counter during routine data collection. Thus, one alarm still has priority, the rest do not.

In the central station, the last word of data from each terminal station is examined for an alarm condition. If desired, to provide a key or check bit, the first bit of the word may always be a logic "1" to indicate an alarm condition, with the remaining bits identifying the exact nature of the alarm.

4. The repeaters
a. The tone repeaters/translators

Figure 8:
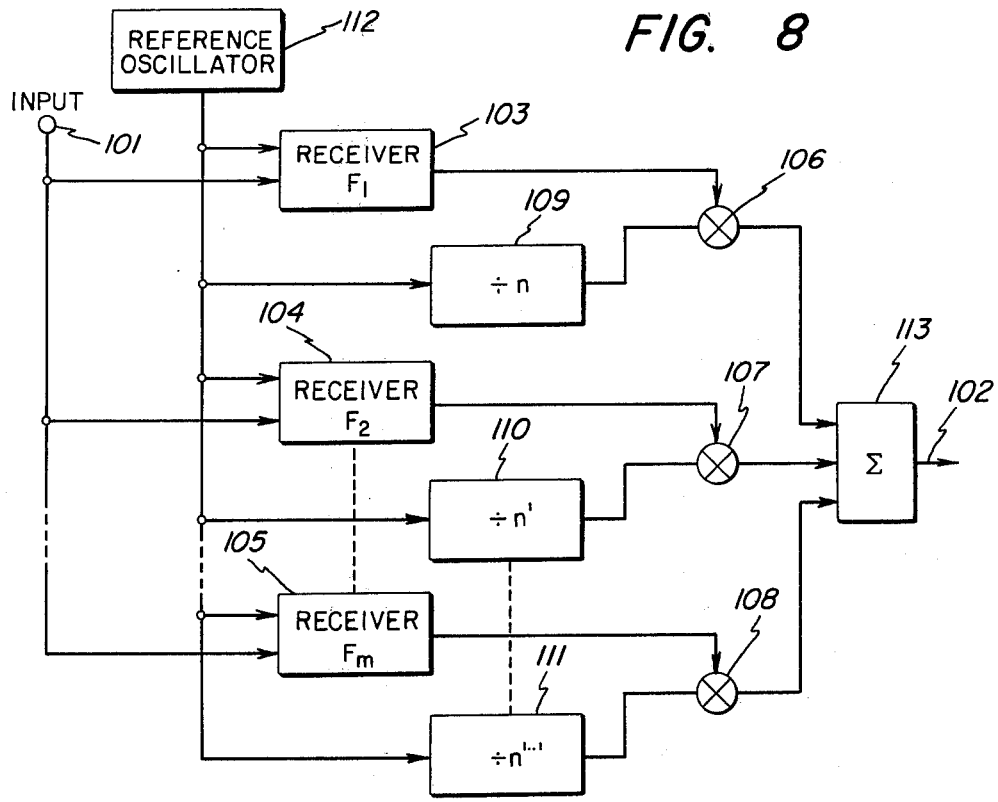
FIG. 8 illustrates a tone repeater/translator.
Figure 9:
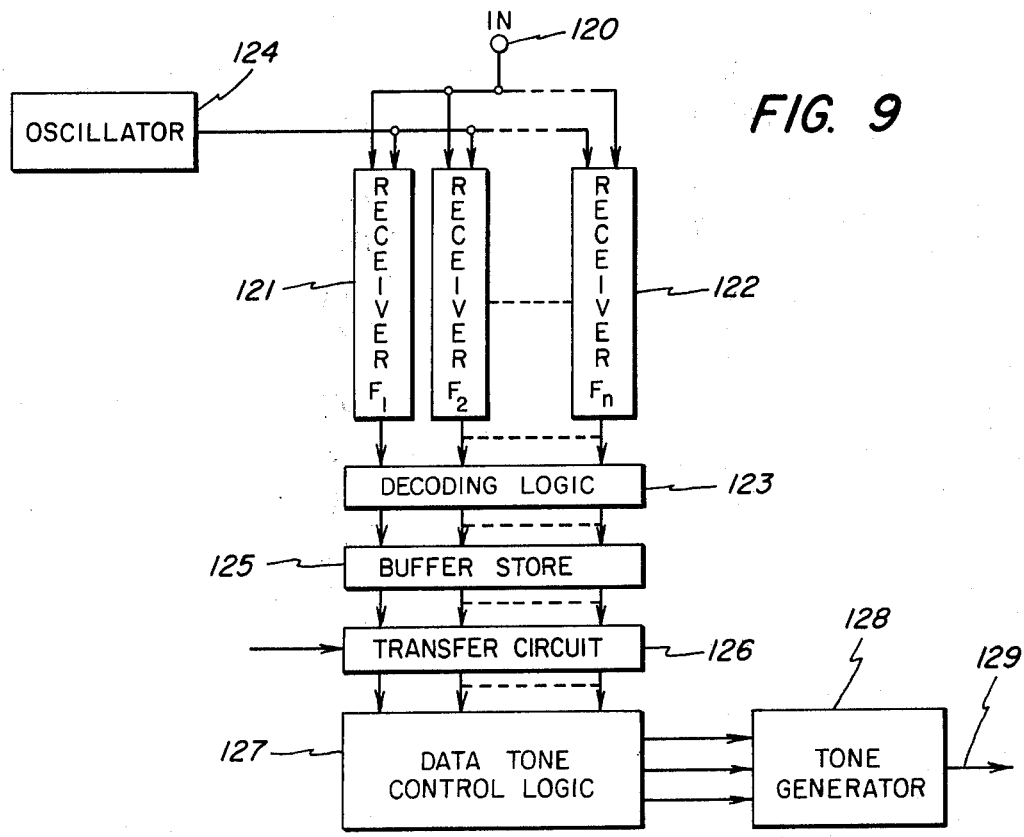
FIG. 9 illustrates an alternative embodiment of a tone repeator/translator.
Figure 10:
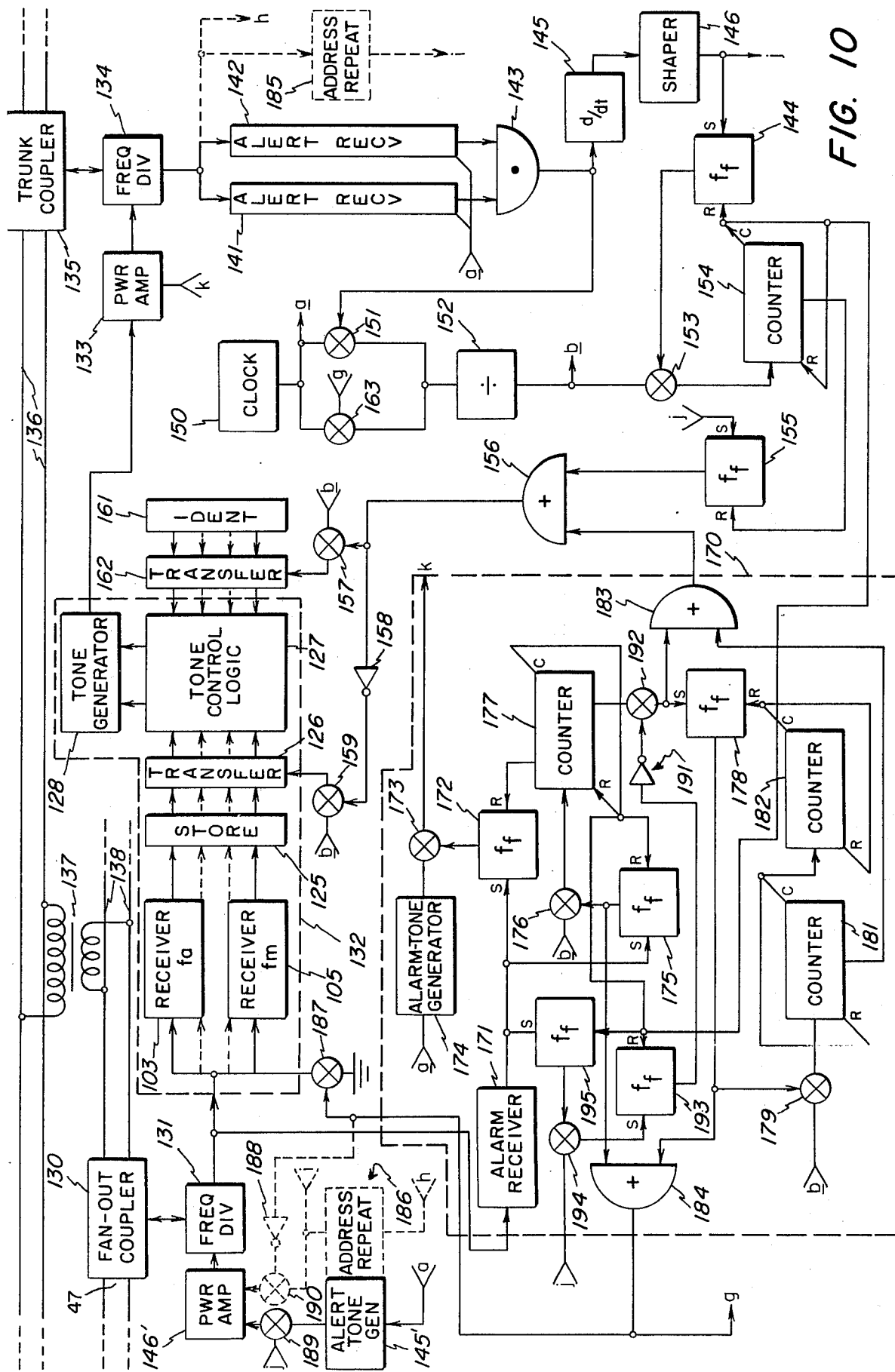
FIG. 10 illustrates the repeater used in the system of the present invention.

FIGS. 8, 9 and 10 relate to the repeaters utilized in the system of the present invention. Specifically, FIG. 10 illustrates a generalized repeater for use in the system of the present invention wherein the interconnections for use as a pole repeater are illustrated by a solid line and additional equipment or connections for use as an intermediate or substation repeater are illustrated by dashed lines. FIGS. 8 and 9 each illustrate a tone repeater suitable for use in FIG. 10

As previously indicated, it is necessary that the tones utilized to communicate from one level to the next be different in frequency to improve isolation between levels since the communication at all levels is carried out in a common transmission medium. This is generally referred to as frequency multiplex. In addition, it is necessary to amplify the signal amplitude in proceeding from one level to the next. While, in theory, one could simply amplify the received signal, for example, by a simple amplifier or a regenerative amplifier, i.e., one that goes into oscillation upon receiving a signal at its resonant frequency, such is undesirable in a power line communication system due to the extreme level of noise encountered on the power lines, often many times larger than the signal itself. Thus, simply amplifying a received signal will amplify an appreciable amount of noise as well. Thus, it is preferred in the system of the present invention to utilize what may be described generally as signal translators, wherein a received signal is decoded and a new signal is generated to replace it, the frequency of the new signal is at a different frequency for transmission at the next level in the frequency multiplex format. FIGS. 8 and 9 illustrate two examples of suitable tone repeaters. FIG. 8 utilizes dividers to generate the tones from a local oscillator, whereas FIG. 9 utilizes tone generators similar to that illustrated in FIG. 2 to generate the tones for the next level.

In FIG. 8, an incoming signal is applied to input 101 and coupled to a plurality of receivers, illustrated by receivers 103, 104 and 105, in parallel. The outputs of receivers 103–105 are coupled to the control input of controlled switches 106–108, respectively. the analogue inputs to controlled switches 106–108 are connected to dividers 109–111, respectively. Dividers 109–111 divide a clock signal, for example, provided by reference oscillator 112, by different divisors to produce a plurality of different frequencies.

When a particular receiver, for example, receiver 104, receives an incoming signal it produces an output pulse which closes controlled switch 107 thereby coupling divider 110 to summation network 113. Thus, the output signal on output 102 is determined by the frequency of reference oscillator 112 and the division ratio provided by dividers 109–111. The frequency of the incoming signal is thus translated to any desired frequency and there need be no direct relationship between the frequency of the incoming signal and the frequency of the signal on output 102.

A similar result is obtained from the tone repeater illustrated in FIG. 9 wherein a logic controlled tone generator, such as illustrated in FIG. 4, is utilized to generate the tone frequencies for the next level, depending upon the combination of tones received.

Specifically, an incoming signal is coupled by way of input 120 to a plurality of receivers 121–122, each responding to a different received tone. Also coupled to receivers 121–122 is oscillator 124 which may, for example, comprise the local clock oscillator or a signal derived therefrom. The outputs of receivers 121–122 are coupled to buffer storage 125 by way of decoding logic 123, then to transfer circuit 126 and data tone control logic 127. Transfer circuit 126 has an additional input to which b clock pulses are connected as shown in FIG. 10. Tone generator 128 functions as described in connection with FIG. 4 under the control of data tone control logic 127.

In operation, an incoming signal is applied to input 120 and thereby to receivers 121–122 in parallel. Each received tone actuates one of receivers 121–122, producing an output form the threshold device. The threshold devices of all the receivers are connected to the inputs of a decoding logic. For the data format of three simultaneous tones, each at one of four possible frequencies, the decoding logic is as more fully described in conjunction with FIG. 13. The output signals from the decoder are temporarily stored in buffer storage 125 for one clock interval. During this interval, the stored information is coupled to tone control logic 127 by transfer gate 126 where it is converted into suitable control signals by the data tone control logic from which the feed-back paths of the dividers in tone generator 128 are determined. Thus, the output signal from tone generator 128 comprises a series of tones directly controlled by the received signal but having no direct frequency relationship to the received tones. The output on line 129 may be a series of tones in either a higher or lower band than the received tones on onput 120. It is understood that FIGS. 8 and 9 represent two examples of suitable tone repeaters for use in the present invention. In the discussion below of the repeaters, the tone repeater of FIG. 9 is used, in conjunction with a three-tone format. This is by way of example only. Other frequency translating tone repeaters may be utilized.

b. The pole repeater

As previously indicated, FIG. 10 illustrates in detail the component parts of the repeaters utilized as pole, substation, or intermediate repeaters. Depending upon the level at which they are used, the pole, substation, and intermediate repeaters differ little except for additional receivers or tone generators utilized to accommodate the number of tone signals being transmitted through the system. As more fully described below, since the pole repeater is receiving only two tones and produces only an alert tone in response thereto, the apparatus for the pole repeater is somewhat simplified as compared to the intermediate and substation repeaters. However, the intermediate and substation repeaters omit the alert tone generator and the associated control switch and comprise additional identification tone repeaters, depending upon the number of tones received; i.e., one for substation repeaters and two for intermediate repeaters. A pole repeater is illustrated by solid lines in FIG. 10, and the additional apparatus utilized for higher level repeaters is indicated by a dashed line.

The low voltage side of the repeater is coupled to lower voltage distribution line 47 by fan-out coupler 130 which may, for example, comprise a toroid having the lower voltage distribution line passing therethrough as a single-turn primary winding. Frequency divider network 131 is connected to fan-out coupler 130 and serves to separate the incoming and outgoing signals at the lower voltage or fan-out side of the repeater. The output side of frequency divider 131 is connected to data tone repeater 132 which is illustrated as comprising the elements previously described in connection with FIG. 9. The output of tone repeater 132 is connected to power amplifier 133. The output of power amplifier 133 is connected to frequency dividing network 134 which has the input/output terminal thereof connected to trunk coupler 135.

Implicit in the foregoing description is the intention that the term "fan-out" refer to the lower voltage side of the repeater and that "trunk" refer to the higher voltage side of the repeater. It will be noted, too, that the repeater effectively couples around distribution transformer 137 in that fan-out coupler 130 is coupled to low voltage line 138 while trunk coupler 135 is coupled to high voltage lines 136.

When a repeater is located at a power substation, the by-passing capabilities of the repeater can be used to the fullest extent, i.e., not only can the step-down transformer be by-passed, but the switchgear and protective devices in the power substation can also be by-passed. This enables one to communicate around the power substation irrespective of the open or closed status of switching devices within the substation, thereby increasing the reliability of the system. In order to accomplish this, the couplers are not connected right at the transformer to the higher and lower voltage lines, but are connected at the line entrance and exit of the power substation.

The output of frequency divider 134 is connected to alert tone receivers 141 and 142. The outputs of receivers 141 and 142 are combined in AND circuit 143. The output of AND gate 143 is connected to the controlling input of controlled switch 151 and differentiator 145. The output of differentiator 145 is connected to shaper 146, the output of which is coupled to the controlling input of controlled switch 189 (by way of connection j), the set input of flip-flops 144 and 155, and by way of controlled switch 194 to the set input of flip-flop 193. The output of flip-flop 144 is connected to the controlling input of controlled switch 153. The input of alert tone generator 145' is connected to continuous clock source a and its output is passed through controlled switch 189 to the input of power amplifier 146'. The output of power amplifier 146' is connected to input of frequency dividing network 131.

There are two parallel paths between clock source 150 and divider 152. One through controlled switch 151 and the other through controlled switch 163. The output of the divider 152 is the local clock pulses b, which pass through controlled switch 153 to counter 154. The output of flip-flop 155 is connected as one input to OR gate 156, to the other input of which is connected OR gate 183 in alarm circuit 170. The output of OR gate 156 is connected to the controlling input of controlled switch 157, and by way of inverter 158, to the controlling input of controlled switch 159. Identification storage register 161 is connected to transfer circuit 162 which couples the identificaton code to tone control logic 127. The tap of counter 154 is connected to the reset input of flip-flop 155. The carry output of counter 154 is connected to its reset input to the reset inputs of flip-flops 144 and 195.

The repeater further comprises an alarm circuit 170 for sensing an alarm tone from the next lower level and relaying that tone to the next higher level at a different frequency. Specifically, alarm circuit 170 comprises alarm receiver 171 coupled to the output of frequency dividing network 131. The output of alarm receiver 171 is coupled to the set inputs of flip-flops 172, 175, and 195. The output of flip-flop 172 is coupled to the control input of controlled switch 173. The switched input of controlled switch 173 is connected to the output of alarm tone generator 174. The output of controlled switch 173 is connected to a second input of power amplifier 133. The output of flip-flop 175 is connected to one input of OR gate 184 and to the control input of controlled switch 176. Controlled switch 176 couples b clock pulses to counter 177. A tap on counter 177 is coupled by way of controlled switch 192 to the set input of flip-flop 178 and to one input of OR gate 183. The carry output of counter 177 connects to its reset and the reset input of flip-flops 175 and 193. The output of flip-flop 178 is connected to the control input of controlled switch 179, which couples b clock pulses to counter 181, and the other input of OR gate 184. The output of OR gate 184 is connected to the control input of controlled switches 163 and 187; and, by way of inverter 188 to the control input of controlled switch 190. Controlled switch 187 shunts the inputs to receivers 103–105 to ground and is used in pole repeaters only. Controlled switch 190 as inserted between the output of address repeaters 185 and 186 and power amplifier 146' is used only in intermediate and substation repeaters. Controlled switch 194 interconnects the output of shaper 146 and the set input of flip-flop 193. The control input of switch 194 is connected to output of flip-flop 195. The carry output of counter 181 is connected to the the reset thereof and to the input of counter 182. The carry output of counter 182 is connected to the reset thereof and to the reset input of flip-flop 178.

The second tap from counter 177, by way of controlled switch 192, and a tap from counter 181 comprise the inputs to OR gate 183. The output of OR gate 183 is connected to the other input of OR gate 156. The output of flip-flop 193 is inverted by inverter 191 and coupled to the control input of controlled switch 192.

Address repeater 185/186 is included for relaying repeater selection codes to a lower level after frequency translation. The address repeater is illustrated as two blocks, 185 and 186, representing the receiving and tone generating portions, respectively, of the tone repeater illustrated, for example, in FIG. 9. Two such repeaters are used in the intermediate repeater, while one is used in the substation repeater.

Generally, the function of the chain of repeaters is to provide an addressable communication link between the central station and the terminal stations and, in the process, provide signal amplifying and frequency translation capability to isolate one level of repeaters from the next. In addition, discontinuities, such as transformers and protective devices are by-passed at signal frequencies. Thus, the repeaters serve as the building block for a random access two-way communication system that reaches everywhere in a power distribution network.

An alert tone from the central station is coupled by way of trunk coupler 135 to frequency dividing network 134. Frequency dividing network 134 corresponds in function to the transmit-receive switch utilized in the terminal station. However, if it is desired to transmit and receive simultaneously, it is necessary to provide a continuous connection between the power amplifier and the receivers with the trunk coupler. Frequency dividing network 134 comprises, for example, band-pass and band-reject filters arranged so as to isolate the transmit and receive portions of the repeater while at the same time coupling both the transmitter and the receivers to the trunk coupler. Thus, the signals are divided in frequency divider 134 according to the frequency thereof to provide isolation between incoming and outgoing signals on the high voltage side of the repeater. Other types of isolation devices, such as hybrid couplers, may be used instead.

The alert tones are detected by receivers 141 and 142, the outputs of which are combined in AND circuit 143 and coupled to the control input of controlled switch 151 and, during the transition from low to high at the output of AND circuit 143, a one-shot pulse is generated by differentiator 145 and shaper 146. The output of flip-flop 178 in alarm circuit 170 is connected to the control input of controlled switch 163 located in a parallel path with switch 151. These two parallel switches control the initial state of the timing control circuitry for the repeater. When an alert or an alarm is received, the corresponding switch in the parallel path is closed, thereby coupling the a clock source to divider 152, which determines the timing of local clock pulses b. These clock pulses are coupled by way of controlled switch 153 to counter 154, controlled switch is turned on by the output of flip-flop 144, which is set by the one-shot pulse from shaper 146. The one-shot pulse also controls the sending of an alert tone through controlled switch 189. Thus, the duration of the alert tone is determined by the duration of the one-shot pulse. This one-shot pulse also sets flip-flop 155 and may also set flip-flop 193 in alarm circuit 170 through controlled switch 194. Switch 194 is controlled by flip-flop 195, which is set by the output of alarm receiver 171 and reset by the carry pulse from counter 154.

As alert tone generator 145' generates an alert tone, which is coupled by way of power amplifier 146' and frequency divider 131 to fan-out coupler 130, the set output of flip-flop 155 is coupled by way of OR gate 156 to controlled switch 157, thereby coupling b clock pulse signals to transfer circuit 162. This causes the identification of the pole repeater to be read out from identification register 161 and transmitted as a tone code from tone generator 128, power amplifier 133, frequency divider 134 and trunk coupler 135. This identifies the repeater to the next higher level in the communication system. During the identification portion, counter 154 has been counting b clock pulse signals and at a predetermined count determined by the position of the tap, e.g., three, produces an output pulse on the tap which resets flip-flop 155, thereby terminating the identification mode after three repetitions of the identifying code.

The set output of flip-flop 155 is converted to a low level signal by inverter 158, thereby shutting off b clock pulse signals from transfer circuit 126 during identification. When flip-flop 155 is reset, switch 157 is opened and 159 is closed, coupling b clock pulse signals through transfer gate 126, thereby enabling the data tones received by way of fan-out coupler 130 and frequency divider 131 to be translated in frequency by tone repeater 132 and transmitted by way of power amplifier 133, frequency divider 134 and trunk coupler 135. After a sufficient time has elapsed for all of the terminal stations to report, as determined by the duration of the alert tones for this repeater from the central station, the output of AND gate 143 goes low and turns off switch 151.

Whenever both switch 151 and 163 are off, the local clock pulse b stops, thus terminating the repeating function in the repeater because the repeater is designed to function only as long as local clock pulses b is present. Actually, a portion of repeater must always be on, to assure that the alert tones and alarm tones may be received to activate this repeater. It is desirable to limit this portion for saving power. The following lists the active components which are always on: clock source 150, alert receives 141, 142; AND gate 143; differentiator 145; shaper 146; controlled switches 151, 163; alarm tone receiver 171; flip-flops 172, 175 and 193; and OR gate 184. The remaining portion of the repeater will be activated when either controlled switch 151 or 163 is closed. This is equivalent to saying the repeater is fully activated whenever the local clock pulses b is present.

The set input of flip-flop 155 is connected to the output of shaper 146 and the reset input is connected to a tap of counter 154. The count capacity at this tap is equal to the number of repetitions of the repeater identification code. (The repetition of identification codes allows the central station to correct repeater identification codes by majority logic, as described below in conjunction with the central station.) When the output of flip-flop 155 is high, it allows controlled switch 157 to pass b clock pulses to transfer gate 162, thus allowing repeater identification codes to be transmitted through trunk coupler 135. The count capacity of counter 154 is one count larger than its tap. Thus, one time interval later, the carry pulse will reset it, and also reset flip-flop 144, to open controlled switch 153 and block the $b$ clock pulses from counter 154.

c. The higher level repeaters

The identification tones are repeated by data tone repeater 132 and transmitted by way of trunk coupler 135 for higher level repeaters. This occurs only at the addressed repeater as determined by alert tone receivers 141 and 142, i.e., receivers 141 and 142 interpret two of the identification tones from a higher level as alert tones, the coincidence of which makes the output of AND gate 143 go high, thereby either enabling alert tone generator 145 as in the pole repeater or transmitting the remaining portions of the alert tones to the next lower level repeater, as in the substation or intermediate repeaters.

In addition to different numbers of receivers or transmitters, the pole repeaters have an alert tone generator 145' and a grounding switch 187, whereas substation and intermediate repeaters have address repeaters 185, 186 and an alert-tone cutoff switch 190. The purpose of controlled switches 187 and 190 is to assure that the alarm task has priority over the data collection task. When an alarm tone is received in a pole repeater, controlled switch 187 grounds the input of the fan-out receiver. This interrupts the data transfer function of the repeater even if the alarm is sounded during the routine data collection task. In the substation or intermediate repeater, the requirement of relaying repeater identification codes rules out grounding fan-out receivers as a means to interrupt data collection. The equivalent result is obtained by controlled switch 190 after the repeater receives an alarm. At that instant, switch 190 interrupts the address code used for alerting lower repeaters. Whenever a lower repeater losses its alert tone, the data transfer function in that repeater is interrupted. Therefore, normal data collection is always interrupted whenever an alarm is sounded.

This interruption feature has another important benefit, in that it minimizes the difficulty of another repeater in the system picking up the alarm. (1) If this should happen, two alarm signals are then relayed to the central station. Because of the tree structure, then two paths will eventually converge. In this situation, interrupting the data transfer function after receiving a first alarm assures only the proper path will be identified by that repeater to the central station. (2) Since there are circuit delays in the system, the correct alarm will arrive first and block spurious alarms.

Alarm circuit 170 is coupled to the output of frequency divider 131. Should an alarm sound at any time, the operation of the system is such that the alarm overrides any other function. An alarm received from a lower level device is detected by alarm receiver 171 which produces an output pulse setting flip-flops 172 and 175. The high output of flip-flop 172 closes switch 173, thereby coupling an alarm tone (at a different frequency) to power amplifier 133. Flip-flop 172 controls the duration of the re-transmitted alarm tone. Controlled switch 187, under the control of flip-flop 178 grounds the input to the receivers in tone repeater 132 during the period of re-transmitting the alarm tone and repeater identification code, thus terminating any data transfer function of the pole repeater if the alarm sounds during routine data collection.

The remaining apparatus in alarm circuit 170 controls the timing of events so that after a single alarm tone is re-transmitted, a repeated identification code of the repeater is transmitted. The number of repetitions is a matter of choice and, as more fully described below, is done for the purpose of providing error correcting capability in the central station.

Counter 177 controls several functions in the operation of the alarm circuit. The capacity of counter 182 is one less than the number of identification code repetitions. Counter 181 determines the spacing between identifications. Counter 181 is necessary to spread out the identification tones since each repeater in the chain to the central station must be given an opportunity to identify itself. Thus, the signal received by the central station is an alarm tone followed by a particular number of repeated identifications wherein the identification tones from each repeater are interleaved so that a number of complete identifications are received.

Specifically, the high output from flip-flop 175 closes switch 176, thereby connecting $b$ clock pulses to counter 177. A first tap on counter 177 resets flip-flop 172, thereby terminating the alarm tone. A second tap, defines a waiting period before the transmission of the first repeater identification code. Thus, the tap is connected at different points in the counter for the pole, substation, and intermediate repeaters. For example, if the first tap is at the first count, the second tap is at the second, third, or fourth count positions for the pole, substation and intermediate repeaters, respectively. An output pulse at the second tap is coupled by controlled switch 192 to set flip-flop 178 and, by way of OR gates 183 and 156, causes the transmission of an identification by closing switch 157, thereby coupling $b$ clock pulse signals to transfer circuit 162. At the end of one count, this identification code terminates but, after a preset time interval, is repeated a fixed number of times as determined by counter 182.

The remaining repetitions are controlled by switch 179 and counters 181 and 182. Specifically, an output from flip-flop 178 closes switch 179, thereby coupling $b$ clock pulse signals to the input of counter 181. A tap at the last count on counter 181 is connected by way of OR gate 183 and 156 to controlled switch 157, thereby initiating a second identification transmission. The position of the tap on counter 177 determines the position of the identification in the data stream to the central station as described above. By varying the position of the identification tone codes, the tones are interleaved and received at the central station as a single identification, repeated a given number of times. The count capacity of counter 181 is always one more than the count spacing between identifications of the same repeater. Each carry output of counter 181 resets the counter and is coupled to counter 182 which counts through capacity to reset itself and flip-flop 178. For example, counter 182 may comprise a pair of flip-flops, thus having a capacity of 4 counts. Thus, after four repetitions, flip-flop 178 is reset, thereby terminating the alarm cycle. Note, however, that the alarm has been repeated five times, once under the control of counter 177 and the remaining four times under the control of counter 182. OR gate 184 combines the outputs of flip-flop 175 and flip-flop 178. Its output is high from the time an alarm is received by alarm receivers 171 until the end of transmission of the repeater identification code during an alarm; i.e., during the entire alarm function of the repeater. The output of OR gate 184 is coupled to controlled switches 163 and 187 and, by way of an inverter, to controlled switch 190.

Since counter 177 has a count capacity one greater than the count at its second tap, its carry pulse occurs one time interval later than the pulse on its second tap. The carry pulse of counter 177 is used for the reset thereof and also for resetting flip-flops 175 and 193. The repeater identification function associated with an alarm is initiated by the output pulse on the second tap on counter 177. This pulse must pass through switch 192 before it can be effective. Therefore, initial repeater identification during alarm only occurs when switch 192 is closed. The retransmission of the alarm tone is initiated by the output of the alarm receiver and transmitted under the control of a pulse on the first tap of counter 177. This pulse does not pass through switch 192 and the alarm tone transfer function of the repeater is not affected by switch 192. Switch 192 is controlled by the output of flip-flop 193 through inverter 191. Thus, switch 192 is closed only when the output of flip-flop 193 is low and opened when high. Flip-flop 193 is set by a one-shot pulse passed through controlled switch 194 from shaper 146. This pulse only occurs during the transition of the output of AND gate 143 from low to high, i.e., during the instant the repeater is being alerted. Flip-flop 193 is reset by the carry pulse of counter 177, which will occur once each time an alarm tone is received by the repeater, but always later than the pulse occurred on the second tap of counter 177.

When the system is dormant or alerted for routine data collection, there is no alarm pulse to set flip-flop 195. Therefore, flip-flop 193 is also not set because either there is no set pulse or it is blocked by open switch 194. Thus the alarm circuit is ready for relaying both the alarm tone and the repeater identification if an alarm is sounded. Then, the alarm receiver output will set flip-flop 195 to close switch 194, although there is no output from shaper 146 to set flip-flop 193 as yet. After an alarm reaches the central station, a new alert to read the alarm data will reach this repeater. Since switch 194 is closed, the one-shot pulse from shaper 146 will set flip-flop 193 and open the switch 192. When the alarm tone associated with the alarm data is received by this repeater, the repeater identification function associated with the alarm will be blocked by open switch 192, although the alarm tone relaying function will still proceed normally. The carry pulse from counter 154 resets flip-flop 195, opens switch 194, and closes switch 192. The next carry pulse from counter 177 will reset flip-flop 193, returning the alarm circuit back to normal. Thus, the alarm tone associated with the alarm data, being sent in response to an alert tone from the central station, does not re-trigger the response as for the initial alarm from the lower level.

The alarm function is similar in all levels of repeaters except that in higher level repeaters, the data comprises the identification tones of all of the lower level repeaters. Thus, the transmission from the intermediate or substation repeaters comprises a single alarm tone followed by the identification of the highest level repeater and then the identification of the lower level repeaters. While the use of a single alarm tone may result in the loss of an alarm, i.e., the alarm goes unanswered, such is not catastrophic due to the alarm repeat feature of the terminal station.

As previously described in connection with the terminal station, the terminal station will repeat the alarm if an answer is not obtained within a predetermined amount of time. However, it is understood that the system operates at a speed such that the alarm is not repeated before communication is completed through the chain to the central station and the central station has had a chance to respond. In a working system, for example, a terminal station repeating an unanswered alarm signal at a rate of once every ten seconds or so would provide an ample time for communication up to the central station and back down again.

In addition, while described in conjunction with a preferred system in which transmission and reception can be carried out at the same time, some equipment simplification can be obtained by utilizing T-R switches for frequency dividing networks 131 and 134. However, this requires that all of the repeaters operate on a time multiplex basis wherein only part of the time is available for reception and the remainder is available for transmission. This appreciably slows down the system and requires synchronization of the repeaters at all levels.

In the two-way communication system of the present invention, the repeaters in the path between the central station and a particular terminal station are activated only for the length of time necessary to carry out the task, as determined by the central data processing computer issuing the command, i.e., by the duration of the alert tone. In the case of an alarm situation, the repeater circuitry maintains an ON condition for the duration of the alarm. If the above-noted time multiplex format is used, wherein only a portion of the time is available for transmission and the remainder available for reception, suitable boxcar circuits, or other suitable devices, must be added to the system at the outputs of the alert tone receivers to convert the sequence of spaced alerting signals into a continuous signal.

5. The central station a. Generally

Figure 11:
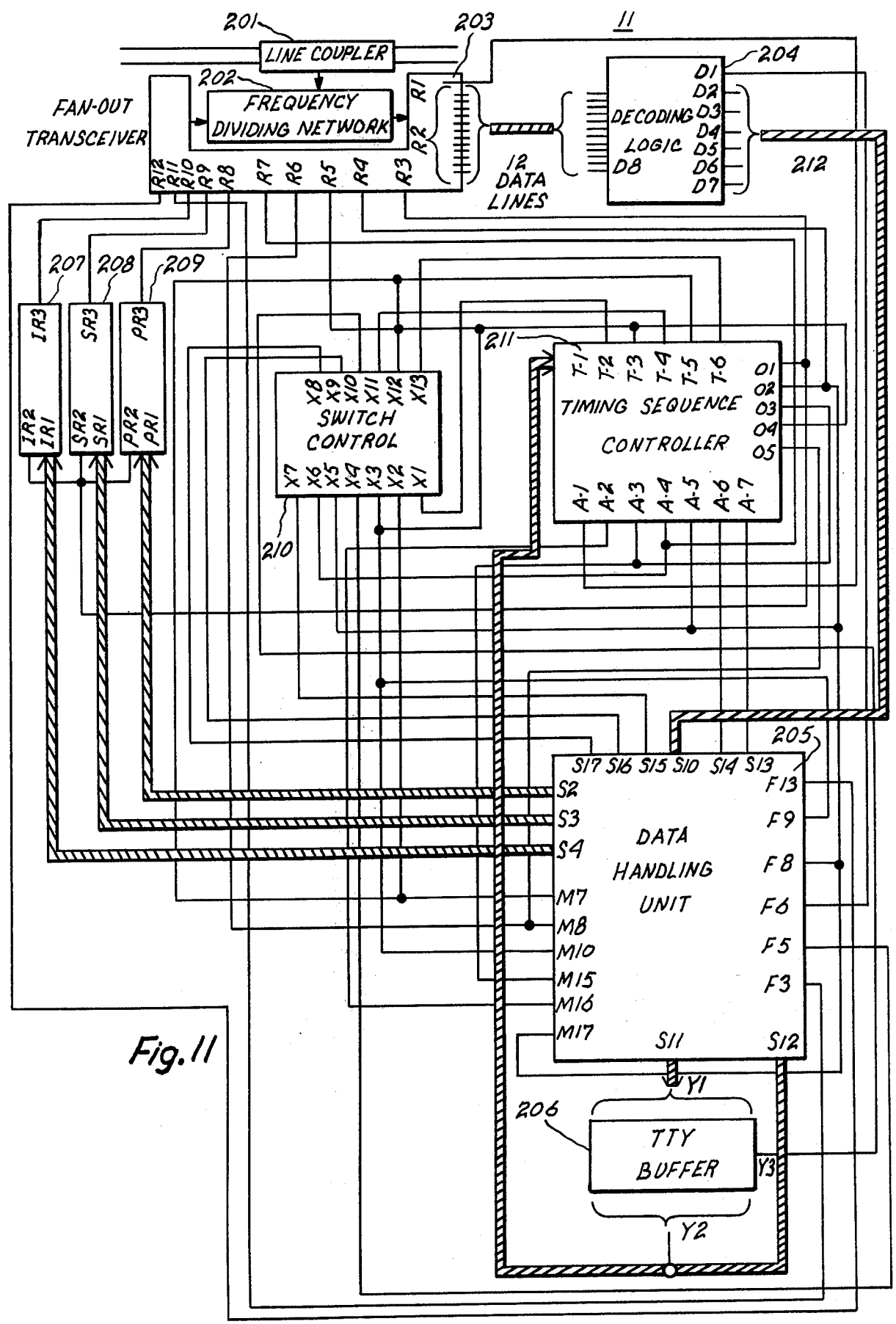
FIG. 11 illustrates the central station.

The central station is illustrated in FIGS. 11–17, of which FIG. 11 is a general block diagram of the central station illustrating how the remaining FIGURES are interconnected.

Functionally, central station 11 is the upper end of the data communication system of the present invention and forms an interface with a central data processing computer (not illustrated), wherein power consumption and billings are calculated and reports of alarm conditions are received. In central station 11, the incoming data is stored temporarily, decoded, converted into a suitable seven bit word code, e.g. ASCII code, for feeding data to the computer through a teletypewriter terminal.

As with other portions of the system, flexibility, economy of apparatus and relatively low cost are among the objects to which apparatus of the central station is directed. To these ends, the central station also utilizes the receivers and tone code generators as described in FIGS. 2 and 4. In addition, the number of responses to the various conditions that may be encountered in operating the system are accommodated by various combinations of sub-tasks. Thus, instead of the number of responses being the same as the number of possible conditions, the response is formed by various combinations of six sub-tasks, thereby simplifying the generation of a response by the central station.

Central Station 11 is coupled to a high voltage transmission line by way of line coupler 201, frequency divider 202 and fan-out transceiver 203. Received data, except for an alarm tone, is coupled by way of a plurality of connections R-2 to decoding logic 204 which also may provide a missing data detection function. The decoded data is coupled to the S-10 input of data handling unit 205 where the information is converted into a suitable code, for example, ASCII code, and transferred to teletypewriter buffer 206. Teletypewriter buffer 206 serves as the connection between central station 11 and one of the teletypewriter terminals of the central data processing computer. It is understood that the computer need not be proximate the central station, but can be coupled thereby by a suitable two-way transmission link, for example a pair of wide-band telephone lines or other communication channel of similar capacity.

Data handling unit 205 also provides control signals supplied by the computer by way of teletypewriter buffer 206 to repeater tone code generators 207 – 209. By suitable selection of tone code patterns, coupled to inputs R-10, R-9, and R-8 of transceiver 203, the unique path is defined through the data transmission network of the present invention to a particular pole repeater. Upon receiving an alert tone, the pole repeater reads out the data from the various terminal stations as previously described. The data is coupled through the data handling unit and teletypewriter buffer 206 to the computer where calculation of power consumption and billings are made. Logic circuitry 210 comprises a plurality of logic circuits for triggering the various subtasks and actuating the switches in data handling unit 205 to carry them out, thereby defining a particular response to the conditions sensed by the data handling unit. In addition, time sequence controller 211, as more fully described in connection with FIG. 17, controls the timing of the various functions within central station 11.

b. The transceiver

Figure 12:
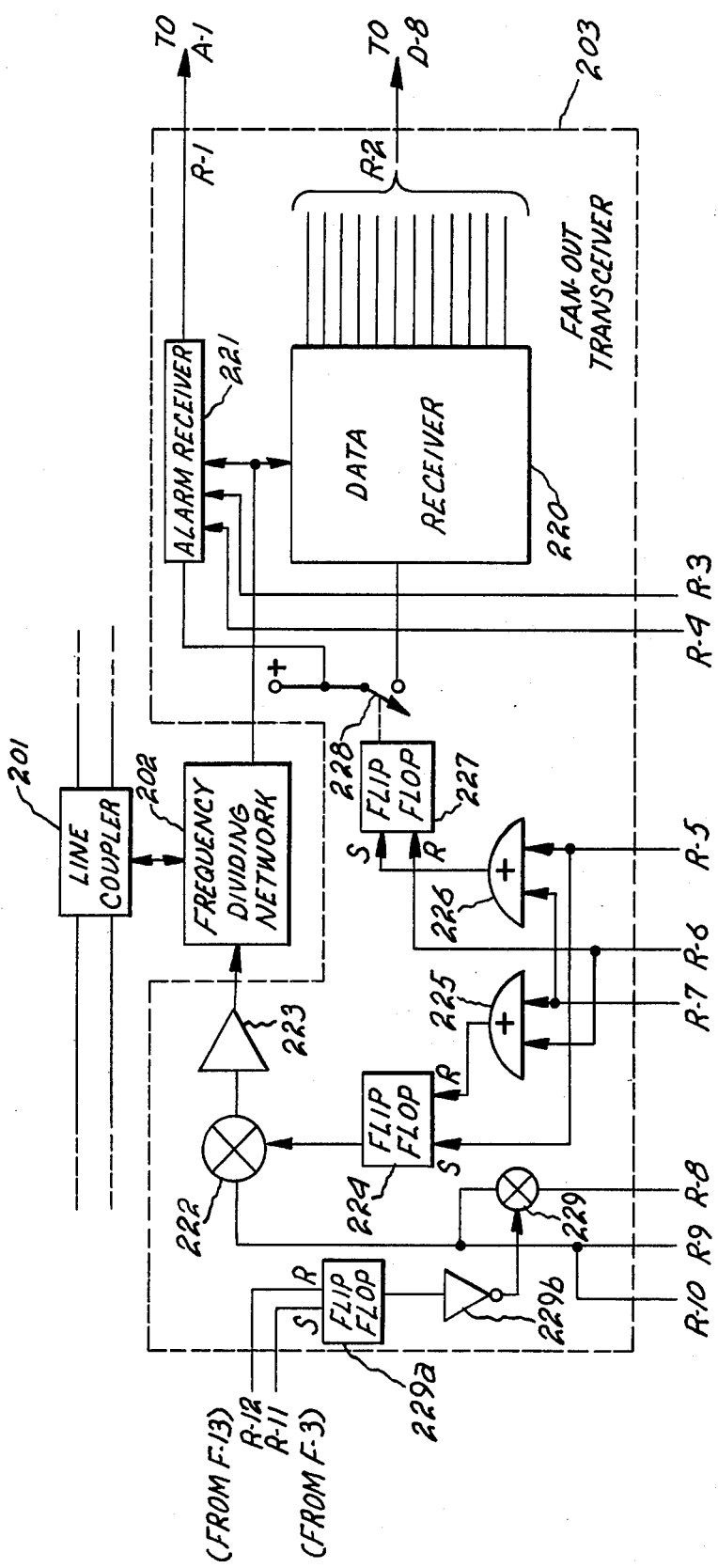
FIG. 12 illustrates a transceiver used in the central station.

FIGS. 12 – 18 illustrate in detailed block diagrams the interconnections among the blocks illustrated in FIG. 11. FIG. 12 is a detailed block diagram of fan-out transceiver 203. In fan-out transceiver 203, incoming signals from line coupler 201 and frequency divider 202 are coupled to the input of data receiver 220 and alarm receiver 221. Data receiver 220 comprises a plurality of tone receivers, previously described, and has the outputs of the threshold comparators collectively designated R-2 in FIG. 12. The format of data code tones within the communication system determine the number of receivers for data receiver 220. In this particular case, since the data tone format uses three tones, each at one of four frequencies and carrying two bits of information each, 12 tone receivers are needed to interpret this code format. There are 12 outputs, collectively designated R-2, as the output of data receiver 220. A multiple conductor cable representing these outputs is connected to the D-8 input of decoding logic 204.

As indicated in FIG. 12, alarm receiver 221 comprises a single output, designated R-1, which is coupled to the A-1 input of time sequence controller 211. As previously noted, if more than one alarm condition is to be sensed in the communication system of the present invention, the difference will be detected in alarm data collection. Alarm receiver 221 always comprises a single tone receiver.

On the transmit side of transceiver 203, the outputs from alert tone generators 207, 208 and 209 are connected respectively to inputs R-10, R-9, and R-8. These inputs are combined and applied as a single input to controlled switch 222. The outputs of the alert tone generators are amplified by amplifier 223 and applied as one input to frequency divider 202. The input R-8 passes through controlled switch 229 which is controlled by the output of flip-flop 229a, the input to which is inverted by inverter 229b. The set and reset inputs to flip-flop 229a are connected to terminals R-11 and R-12 respectively. R-11 is connected to output terminal F-5 of data handling unit 206 while R-12 is connected to F-13 of the data handling unit. When flip-flop 229a is set, controlled switch disconnects the alert tone for pole repeaters from the signal input to controlled switch 222. This disconnects pole repeater selection tone generator 209 from the power amplifier at the beginning of the fourth sub-task (more fully described below).

Control circuitry within fan-out transceiver 203 comprises flip-flops 224 and 227 and OR gates 225 and 226. Flip-flop 224 is normally in the "set" state, thereby closing controlled switch 222 for transferring the generated alert tones to amplifier 223. The set input of flip-flop 224 is connected to input R-5 which is also connected as one input to OR circuit 226. The output from OR circuit 226 is connected to the set input of flip-flop 227. Flip-flop 227 actuates power switch 228 thereby providing power to data receiver 220 from a source of supply schematically illustrated as a plus (+) sign. The input to R-5 is an initiation pulse from the T-3 output of timing sequence controller 211. A holding pulse from the M-6 output of monitoring device 282 in data handling unit 205 is coupled to the R-6 input, which is coupled by way of OR circuit 225 to the reset input of flip-flop 224 and directly to the reset input of flip-flop 227. This serves to shut off the transceiver temporarily during data collection, either at end of normal operations or whenever monitoring device 282, internal to data handling unit 205, sense the occurrence of something abnormal. Input R-7 is a control signal coupled from the A-4 output of the alarm circuitry internal to timing sequence controller 211; this signal indicates an alarm tone is received and serves to shut off the transmission side of fan-out transceiver 203 so that, if there is routine data collection at that moment, it will be interrupted. A signal on input R-7 also sets flip-flop 227, thereby enabling data receiver 220 to receive the anticipated address code for the repeaters that relayed the alarm while the central station is inactive. The remaining inputs, R-3 and R-4, to transceiver 203 are from the master oscillator output O-1 and clock pulse output O-2 in the oscillator portion of timing sequence controller 211 and serve to operate the receivers in the manner previously described in connection with the tone receivers.

c. The decoding logic

Figure 13:
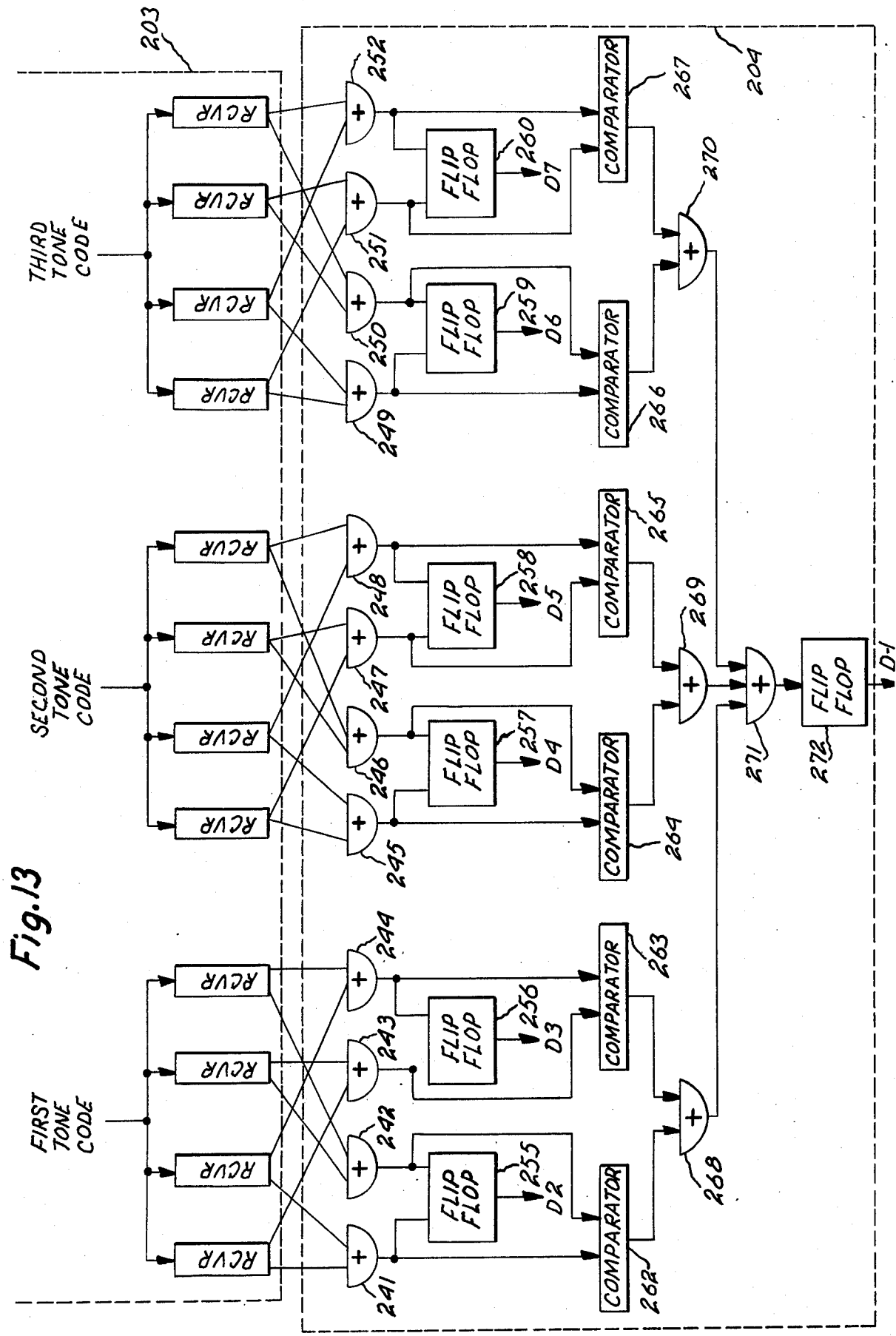
FIG. 13 illustrates the decoding logic used in the central station.

FIG. 13 is a detailed block diagram of the decoding logic within block 204 of FIG. 11. Specifically, decoding logic 204 comprises a plurality of OR gates 241–252 connected as illustrated to the outputs of the receivers in transceiver 203. The outputs of OR gates 241–252 are connected as illustrated to the inputs of flip-flops 255–260. The outputs of flip-flops 255–260 form a six-bit code word D2–D7, which forms one part of the output of decoder 204. The outputs of OR circuits 241–252 are also connected as illustrated to the inputs of comparators 262–267. The outputs of comparators 262–267 are combined as illustrated by way of OR gates 268–271 to form the input to flip-flop 272. The output of flip-flop 272 comprises the D1 output of decoding logic 204.

Essentially, decoding logic 204 comprises two sections. The first, formed by OR gates 241–252 and flip-flops 255–260, performs the decoding function for converting the received signal to a six-bit code for use in the central station. Comparators 262–267 and the OR gates associated therewith form the missing data detector portion of decoding logic 204.

As previously discussed, the received signal comprises three tones, each one being a selected one of four tones for a total of 12 possible tones. The tones are detected by three groups of four receivers in transceiver 203, and these groups are arranged as illustrated. Considering the central portion of decoder 204, the output of the first receiver is connected to OR gates 245 and 247. The output of the second receiver in the group is coupled to OR gates 245 and 248. The output of the third receiver in the group is coupled to OR gates 246 and 247, and the output of the fourth receiver in the group is coupled to OR gates 246 and 248. The outputs of OR gates 245 and 247 form the set inputs to flip-flops 257 and 258, respectively. The outputs of OR gates 246 and 248 form the reset inputs to flip-flops 257 and 258, respectively.

The adopted data format assigns two bits of information to each data tone; thus, it may be received at any one of the four receivers in a group corresponding to the four possible discrete frequencies assigned to that tone. When the presence of the data tone at a particular receiver in the group is established, the output of that receiver goes to logic 1. A properly received signal will produce one and only one logic 1 among a group of four receivers. According to the arrangement shown in FIG. 13, this causes the outputs of two of the OR gates to go to logic 1 and assures that one of the logic 1 appears at one of the two left-hand OR gates, and that the other logic 1 appears at one of the two right-hand OR gates in the group.

Assuming, for example, that the second tone is detected in the first receiver of the second group, then the outputs of OR gates 245 and 247 will be a logic 1 while the outputs of OR gates 246 and 248 are a logic 0. Thus, flip-flops 257 and 258 are placed in the set position and a logic 1 appears at outputs D4 and D5. Similarly, as can be seen by inspection, a tone received by the remaining receivers in the second group would similarly define a unique code signal at outputs D4 and D5. The receivers and OR gates for the first and third groups function similarly to provide a unique output signal at outputs D2, D3, D6 and D7, uniquely defining in a six-bit word the particular three out of 12 combination of received tones from the lower portions of the communication system.

Continuing with the second tone group, the missing data detector functions as follows. Binary comparators 264 and 265 produce a logic 1 output only when the inputs thereof are the same. Thus, if no data is received, a logic 0 is presented to the inputs of comparators 264 and 265. This logic 1 output produced under these conditions is coupled by way of OR gates 269 and 271 to the input of flip-flop 272 which goes into the set state and produces a logic 1 at the output, D1. By virtue of the interconnections between the receivers in the second group in transceiver 203 and OR gates 245–248, any received signal will be coupled to one side of comparators 264 and 265, thereby producing a logic 0 at the outputs thereof.

The missing data detector portions of decoder 204 also provide an erroneous data reception indication in that the reception of two tones within a single group will cause both inputs to one of binary comparators 264 and 265 to be a logic 1. When both inputs are the same logic level, that binary comparator will produce a logic 1 output signal which is coupled to flip-flop 272, thereby again causing a logic 1 to appear at output D1 to indicate the error. As more fully explained below, the lack of data or an erroneous data reading will cause the central station to request a second reading through the preselected path to a particular pole repeater. The missing data indication at output D1 is coupled to the F-6 input of data handling unit 205, while outputs D2–D7 are coupled by multiple conductor cable to the S-10 input of data handling unit 205 where, as more fully described below, the data is stored temporarily and ultimately transferred to the data processor by way of teletypewriter buffer 206.

d. The data handling unit

Figure 14:
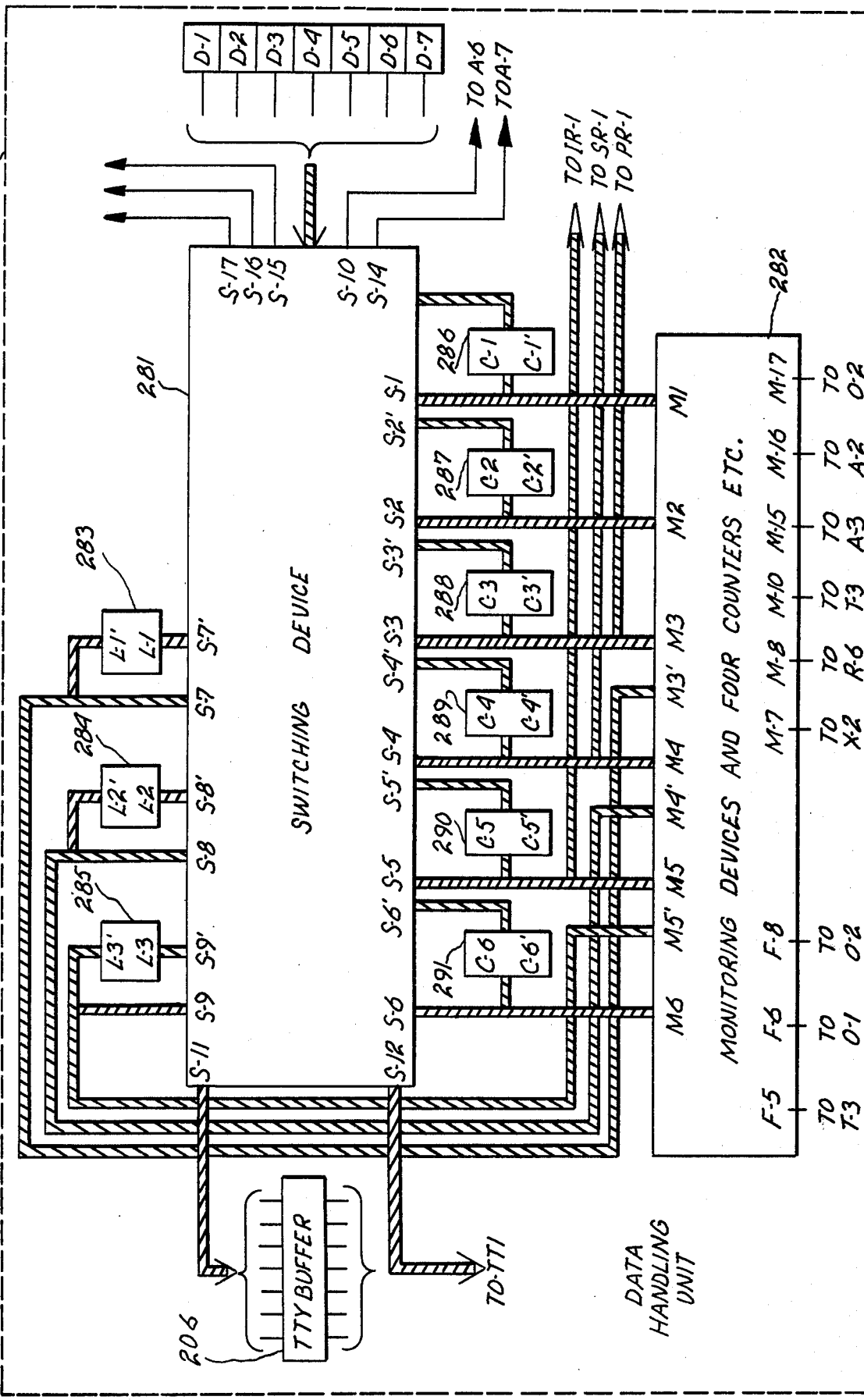
FIG. 14 illustrates the major portions of the data handling unit of the central station.

FIG. 14 illustrates in block form the major sections and functions of data handling unit 205. Data handling unit 205 comprises a switching device 281 and a monitoring device 282. Connected to switching device 281 are majority logic circuits 283–285, each having six bit positions corresponding to outputs D2–D7 in parallel from the decoding logic. This six bit word corresponds to the address code of a repeater. The repeated address codes appearing at the decoding logic output are sequentially transferred to appropriate majority logic positions through the input section of six pole majority logic stepping switch 297. After the repeated address codes are fed to a majority logic circuit, the output at any bit position corresponds to the majority of the logic levels of the repeated inputs to that bit position. The construction and operation of majority logic circuits is well known in the art and will not be further detailed here. The outputs of the three majority logic circuits are transferred to corresponding control memories through the synchronous stepping of the six pole output section of majority logic stepping switch 304 and the six pole input section of control memory stepping switch 305.

Connected to the other side of switching device 281 are a plurality of control memories 286–291 which receive or deliver information from or to the data processing computer by way of teletypewriter buffer 206. In addition, as more fully described below, three of the control memories, 288–290, are interconnected with majority logic circuits 283–285 by way of switching device 281 and store the corrected repeater identification codes for three levels of repeaters for transmittal to the data processing computer.

Monitoring device 282 comprises four counters and logic circuitry for controlling the timing and operating of the central station, including the selection of sub-tasks to be performed and the detection of failures when the system is not performing properly. As previously noted, these sub-tasks are arranged in predetermined groups to provide the various responses for the different input conditions that may be encountered. The first sub-task is loading the instruction given by the data processing computer through the teletypewriter buffer to the controlling memory of the data handling unit. The format of the instruction may, for example, comprise eight 7-ASCII code words.

The second sub-task is the reading of the data stored in the six control memories to be reported back to the data processing computer through the teletypewriter buffer. This sub-task is triggered by a holding pulse generated by the monitoring device in response to changes of logic levels in control memory 291.

The third sub-task is to establish a two-way communication path between the central station and a group of time multiplexed terminal stations. The particular group and the actual communication path selected under this task is predetermined by the information stored in controlling memories 288-290. The data transfer path for this task is from the buffer memories at the output of the decoding logic to majority logic circuits 283-285.

The fourth sub-task is to change over from one pole repeater to the next, while the alerted substation and intermediate repeaters remain unchanged, after the completion of data collection from all terminal stations reached through the original pole repeater. The data collected from all the terminal stations on a single pole repeater that form a time-multiplexed transmission group is referred to herein as a complete line of data. The initiation of this sub-task is controlled by instructions given by the computer. In particular, if the second bit of a control memory is set to a logic 1, upon reception of a complete line of data, the change of pole repeater is initiated until the number of pole repeaters reached by this procedure is equal to the number specified by the second to seventh bit in control memory 287.

The fifth sub-task is data collection. This sub-task follows either the third or the fourth sub-task immediately. The data transfer route for this sub-task is from the receiver-buffer memory to the data transformation unit and from the data transformation unit to the teletypewriter buffer. Thus, all the data is transmitted by the terminal station is transferred directly to the data processing computer through its teletypewriter terminal. After all of the lines of time multiplexed groups specified by an instruction have been collected, a line counter within monitoring device 282 produces an output pulse, which serves to terminate the operation of the central station and trigger the second sub-task, wherein the data stored in controlling memories that specifies the transmission path, scope, duration and monitoring of the data collection will be read back to the data processing computer.

The duration of this sub-task is specified by the contents stored in memories 286 and 287. The second to seventh bit in control memory 286 specifies the duration of the data collection at each pole repeater while the second to seventh bits in control memory 287 specifies the number of pole repeaters selected in a given data collection.

The sixth sub-task is the response to an alarm originated from the terminal station by the central station. This response includes the termination of on-going data collection, if any, the collection of repeater identification codes which describe the specific route over which the alarm tone has been relayed to the central station, and transferring the identification data to the control memories. The data transfer path within the central station is similar to the second sub-task; from the buffer memories at the output of the decoding logic to majority logic circuits 283-285.

The various sub-tasks are carried out by way of initiation pulses in association with the actuation of switching device 281, illustrated in detailed form in FIG. 15. All of the data flowing through the central station, either from or to the central data processing computer, passes through switching device 281, which controls the flow of data through various possible paths, depending upon the sub-task being carried out. The changes in connections between the various components and data sources at various times is illustrated schematically in FIG. 15 as a plurality of stepping switches. It is understood by those in the art that while illustrated as a plurality of stepping switches, the various changes in interconnections can be easily implemented utilizing integrated circuit technology as a plurality of logic gates. The illustration of FIG. 15 as a plurality of stepping switches is merely to simplify the description of the functioning of switching device 281.

Input S-10 to switching device 281 comprises seven wires from the data buffer formed by flip-flops 255-260 and 272 in FIG. 13, the information outputs D-2 to D-7. In addition, as a first bit of information, is the output of the missing data detector D-1. The outputs from the buffers are transferred through a seven bit data transfer gate to seven-pole, double-throw switch 296. The last six bit outputs of the first position of switch 296 is connected to the input section of six pole majority logic stepping switch 297. Comparing FIG. 15 with FIG. 14, it can be seen that the inputs to the majority logic circuits, 283-285, are sequentially selected by six pole input switch 297 so that the data received from the repeaters without the first bit for missing data indication is sequentially transferred into the proper majority logic a number of times corresponding to the number of code repetitions. And later after the inconsistencies between repeated bits have been corrected according to majority voting, their outputs are sequentially transferred to proper control memories in the data handling unit through the six-pole output section of stepping switch 304 in conjunction with six-pole input stepping switch 305 in switching device 281.

The second position output of seven pole switch 296 is connected to terminal 298, which is the seven wire input to code transformation unti 299. Code transformation unit 299 serves to transform the received data code in certain circumstances.

During data collection, at any time interval, if any data is missing or some error to transmission has caused decoding difficulties, these conditions are sensed by missing data detector, and a logic 1 will be written into first bit of buffer memory D-1. In such an instance, some of the other flip-flops in the remaining six bits of data buffer memory D2-D7 will be set randomly at least for some of the bits or even for all the bits causing decoding difficulty. The data format at the buffer memory, for current data is that the first bit is always logic 0 followed by six random bits, which for missing or erroneous data the first bit is always logic 1, also followed by six random bits. This distinction is sufficient for the computer to interpret the correct or incorrect data normally. At the central station all operational and monitoring codes used are seven bit words with the first bit always assigned logic 1. Therefore, it is possible for missing or erroneous data to coincide with these operating or monitoring codes. To avoid the possibility of confusion to the computer or the triggering of the wrong operation at the central station, the same code cannot have two different meanings. To accomplish this, the data transformation unit is used to convert all missing or erroneous data to a standard seven bit word: 1000000. Since no useful information is carried by missing or erroneous data, this transformation causes no loss of useful information and a unique code is produced.

Six-pole, two position switch 303 interconnects the six-pole output section of the majority logic stepping switch 304 in its first position. This code transformation assumes the computer will always know when one word of data is missing. The transformed code is fed into teletypewriter buffer 206 for communication with the computer by way of the first position on seven pole two position switch 301 in switching device 281. The common position of switch 301 is connected by seven bit parallel data transformer data 302 to seven bit teletypewriter data buffer 206. As illustrated in FIG. 14, a plurality of control memories are interconnected with switching device 281 so that data from switch 303 is sequentially read into control memories 286–291. Output section 307 of the six-pole control memory stepping switch is connected to the second position of the last six bit poles of seven-pole, two position switch 301. The first bit pole at the second position is permanently connected to a logic 1 output. The common terminal of the seven pole switch is connected to seven bit, parallel data transfer gate 302. Thus, the transfer of information sequentially from the control memories to the last six bits of teletypewriter buffer 206 is by way of switches 307 and 301 and gate 302, while the first bit of the buffer always receives a logic 1 in this position from switch 301 and gate 302. In this way, the data stored in the central station control memories always have a logic 1 as the first bit when the data therein is read out into the data processing computer in association with a specific set of collected data. Thus, the monitoring information can be examined and the two-way communication path can be verified by the computer whenever it is necessary. A single pole, single throw switch 309 is mechanically coupled to the control memory stepping switch so that it closes when the stepping switch reaches its sixth position. The two terminals of the switch are connected to terminals S-13 and S-14. Thus S-13 and S-14 will be shorted together only when the control stepping switch reaches its sixth position. During the operation of the communication system, the first two memories 286 and 287, are for data format and timing control, as discussed below; the next three memories, 288–290, define the actual two-way communication path; and the last memory 291, monitors the condition of the communication system, for example, malfunctions and alarms.

Thus, when operation of the communication system is initiated, control codes from the data processing computer are read into the teletypewriter buffer and coupled sequentially into the control memories by way of stepping switch 306. As previously noted, these memories control the timing and define the actual two-way path through the data communication system. As can be seen by inspection of FIGS. 15 and 11, the outputs of these memories serve to control the tone codes generated by generators 207–209, the outputs of which are coupled through fan-out transceiver 203 to frequency dividing network 202 and line coupler 201 for alerting three levels of repeaters. The communication system of the present invention then functions as previously described to cause the initiation of data readout from the terminal stations coupled to a particular pole repeater.

At the beginning of the period, the data received is used for verification of the communication path established, and is coupled by way of the data buffer flip-flops through switches 295 and 296 to the majority logic stepping switches, 297 and 304. If the outputs of the majority logic circuits coincide with the address defined in the controlling memories, then switch 296 is actuated to connect the data buffer with the input of code transformation unit 299 beginning the collection of the terminal station data. The output of the code transformation unit is coupled by way of switches 301 and 302 to teletypewriter buffer 206 which then transfers the information to the central data processing computer. After each line of data is received, a new path is defined through the communication system to obtain data from different groups of terminal stations.

During an alarm, the operation of the central station is interrupted and a priority is afforded the alarm signal. The identification codes following the alarm tone are coupled through the majority circuits by switches 205–297 and fed into control memories 287–289 by switches 303–306 (sub-task 6). The control memories are read out to the data processing computer by way of teletypewriter 206 (sub-task 2). The central station then initiates data collection from the pole repeater sending the alarm signal (sub-task 3 and 5). Finally, sub-task 2 is again performed to report the alarm data to the computer thereby completing the alarm response.

The operation of switching device 281 may thus be summarized in terms of the flow of information as follows. Information may take one of the following paths through switching device 281: (a) receiver buffer to code transformation unit to teletypewriter buffer; (b) receiver buffer to majority logic; (c) various majority logic to control memories; (d) control memories to teletypewriter buffer; (e) teletypewriter buffer to controlling memories.

The responses by the central station are made up by various combinations of the sub-tasks enumerated above. In summary, these responses are formulated as follows. When the central station is collecting data from a single group of terminal stations reached through a single pole repeater, the task is accomplished as the following sequence of sub-tasks; 1-3-5-2. The central station collects data from groups of terminal stations through N different pole repeaters as follows: 1-3-5-(4-5), wherein the two sub-tasks in parenthesis are repeated N-1 times. An alarm can occur at various stages of the operation of the communication system, requiring slightly different combinations of sub-tasks. If an alarm occurs when the system is inactive, the response is as follows: 6-3-2. If the alarm occurs when the system is collecting data, the response is formulated as follows: 6/2-3-2, wherein the sixth sub-task interrupts the data collection and causes a reading of the constants stored in the control memories to determine the identity of the repeater relaying the data in aborted condition. If an alarm occurs when the system is receiving instructions from the data processing computer, the response is the same as above except that the sixth sub-task is interrupted until the information is completely loaded in the central station, then the data collection is aborted and the second sub-task carried out to read the identify of the repeaters involved in the intended path for the unexecuted data collection to the data processing computer. Thus, the response may also be written as 6/2-3-2.

The response of the central station to these various conditions may be more clearly understood by considering FIGS. 16 and 17 in which data handling unit 205 and timing sequence controller 211 are illustrated in detailed form.

Referring to FIG. 16, made up of FIGS. 16a and 16b (on separate sheets of the drawing) which directly connect to each other, the data handling unit may be divided into three main sections. One comprises six control memories, also illustrated in FIG. 14, bearing reference numerals 286–291. The second portion comprises the majority logic circuits including registers 283–285. The third portion comprises what may be considered monitoring devices, comprising logic circuitry and four counters, 331–334. Interconnecting the third, fourth, and fifth control memory with the majority logic circuits are comparators 322–324, respectively. Five-bit comparator 321 compares the last five bits (third through seventh) of data from first control memory 286 with the data stored in data counter 332. Comparator 325 compares the data stored in control memory 291 with the data stored in register 329. Register 329 comprises all zeros so that comparator 325 serves as a monitoring device, such that certain events within the central station cause one of the digits of register 291 to go from a logic 0 to a logic 1. In order to simplify FIG. 16, switching device 281 has been omitted; however, the interconnections are illustrated by references to the switch positions illustrated in FIG. 15.

In addition to switching device 281, data transfer gates are utilized to interconnect the memories with selected ones of the counters in the monitoring portion of the data handling unit. Specifically, data transfer gate 335 interconnects the data output from the first five bits of control memory 286 with step counter 331. Transfer gate 336 interconnects control memory 287 with line counter 333. A strobe pulse for causing the transfer of the data by gate 336 is provided on input M-11, which is connected, along with input F-9 and O-4, to output T-3 of timing sequence controller 211 for the initiation pulse of the third sub-task. The strobe pulse for transfer gate 335 is through OR gate 335a, one of the inputs to which are connected to terminals M-11, which is connected with F-9 to receive the initiation pulse for the third sub-task from T-3. The other input of OR gate 335a is connected to F-3 from the carry output of counter 331.

Counter 334 provides a portion of the timing control within data handling unit 205 in a manner similar to that of the repeaters. Specifically, the time when counter 334 is active defines a time period for repeater identification. Taps are utilized on counter 334 to block the alert tone ot the pole repeaters for two time intervals after the initiation of the fourth sub-task and to control the timing of the generation of strobe pulses for actuating comparators 323 and 324. The first tap is located at the second count of counter 334 and is connected to terminal F13. Clock pulses provided on input F-8 are coupled to one of two outputs in gate 338 under the control of flip-flop 337. In the reset state, gate 338 couples the clock signals to the input of counter 334. At appropriate time intervals, determined by the position of the taps on counter 334, AND gates 341 and 342 are enabled, thereby providing strobe pulses to comparators 323 and 324, respectively for comparing data between majority logics 284 and 283, and corresponding memories 289 and 290. In the set state, gate 338 couples clock signals to the input of counter 331. Each clock pulse reduces the contents of counter 331 by one so that the time between the application of clock pulse signals to the input of counter 331 and a "carry" pulse appearing at the output thereof, when the content is reduced to zero, is determined by the information stored in counter 331 from control memory 286. Upon the production of a carry pulse, flip-flop 337 is reset, thereby coupling clock pulse signals to counter 334. AND circuit 339 senses the carry pulse from counter 331 and, assuming the first bit in control memory 286 is also a logic 1, produces an output pulse which initiates the fourth sub-task. Thus, the logic 1 in the second bit of memory 286 is used to indicate data will be collected from more than one pole repeater, but via the same substation repeater. This output pulse appears at output F-5 for increasing the content of memory 288 by one which modifies the pair of address tones generated by generator 209 for alerting a new pole repeater. As indicated in FIG. 11, the output pulse at F-5 is coupled to input X-4 of switch controller 210 to initiate the fourth sub-task, i.e., the change over to a new pole repeater for the collection of the next line of data.

The carry output of counter 331 is also coupled to the reset input of flip-flop 340 and OR gate 335a. The set input to flip-flop 340 is connected to input F-9, which received the initiation pulse for the third sub-task from T-3. Only during the set period of flip-flop 340 can AND gates 341 and 342 be activated by a pulse on the tap of counter 334. As illustrated in FIG. 16, by way of example, a logic 1 level at the sixth and ninth bit positions in counter 334 coincident with the set output from flip-flop 340 actuates AND gate 342 and 341, respectively. The output pulses from AND gates 341 and 342 actuate comparators 323 and 324, respectively, as previously described. The reset input of flip-flop 340 is the carry pulse from step counter 331. Since that pulse also initiates the fourth sub-task, after the reset of flip-flop 340, AND gates 341 and 342 cannot be activated. Thus, there is no comparison of substation and intermediate repeater addresses during the fourth sub-task. Input M-9, which is also coupled to output F-7 for the carry pulse of counter 334 actuates comparator 321 to sense whether a line of data is missing, and actuates AND gate 345 by way of delay means 343 and a single shot multivibrator 344, the output of which occurs at the twelfth interval after the initiation pulse for the third sub-task. The output of AND gate 345 is coupled to the strobe input of comparator 322. Thus, the output from AND gate 345 causes the comparison between the information stored in majority logic 285 and control memory 288. The outputs of comparators 321–324 and carry output of line counter 333 are combined in OR gate 326 which has the output thereof connected as one input to OR gates 327 and 328. The other input to OR gate 328 is coupled to the reset alarm pulse. The output of OR gate 328 is connected to one bit position in control memory 291. In addition, other inputs to control memory 291 are obtained from comparators 321–324 and OR circuit 346. The inputs to OR circuit 346 comprise the alarm and reset alarm inputs, M-15 and M-16, respectively, from outputs A-2 and A-3 of timing sequence controller 211. The output of OR circuit 346 provides the other input to OR circuit 327. The output of OR circuit 327 comprises the strobe input to comparator 325. The output from OR circuit 328 is coupled to one bit of control memory 291 and to the N-7 output of data handling unit 205. When comparator 325 is strobed, and the contents of memory 291 is different from the all zero contents of register 325, a holding pulse is produced at the output of comparator 325, which is coupled to output terminal M-8. OR gate 328 is coupled to the second bit of memory 291 (the first bit in all the memories is not illustrated). The output of OR gate 346 is coupled to the third bit of memory 291. Thus, an alarm changes only the third bit to a logic 1 while the reset alarm changes both the second and third bits to logic 1 in memory 291. At end normal data collection, a carry pulse is produced by causing OR gate 326 to change the second bit of memory 291 to a logic 1. During routine data collection, every bit of missing data produce a pulse to advance counter 332. If every bit of data in a line is missing, then the content of counter 322 will agree with the last five bits of control memory 281. Comparator 321 will produce a output pulse when strobed. This pulse changes the fourth bit of memory 291 to logic 1 and causes the second bit of memory 291 to go to a logic 1 by way of OR gates 326 and 328, respectively. When the pole repeater address stored is majority logic 285 does not agree with memory 288, comparator 322 will produce a pulse when strobed. This pulse causes the fifth bit of memory 291 to change to a logic 1 and, by way of OR gate 326, changes the second bit of memory 291 to a logic 1. When the substation repeater address stored in majority logic 284 does not agree with memory 289, comparator 323 produces a pulse when strobed. This pulse changes the sixth bit of memory 291 to logic 1 and, by way of OR gate 326, changes the second bit of memory 291 to logic 1. When the intermediate repeater address stored in majority logic 283 does not agree with memory 290, comparator 324 produces a pulse when strobed. This pulse changed the seventh bit of memory 291 to a logic 1 and, by way of OR gate 326 changes the second bit of memory 291 to a logic 1. Because a logic 1 is always written in the first bit of all codes stored in the control memories during transfer to the teletypewriter buffer for relaying to the computer, the computer will read the following monitoring codes to indicate various condition of the data collected from the central station.

1100000 Normal ending of data collection
1100001 Wrong address intermediate repeater
1100010 Wrong address in substation repeater
1100100 Wrong address in pole repeater
1100011 Wrong address in intermediate and substation repeater
1100101 Wrong address in intermediate and pole repeater
1100110 Wrong address in substation and pole repeater
1100111 Wrong address in intermediate, substation and pole repeater
1101000 Missing a complete line of data
1010000 Data collection interupted by an alarm
1110000 Alarm addresses and alarm data.

Switch controller 210 receives the triggering pulses for various sub-tasks. Its major function is to generate all the necessary control pulses according to the sub-task performed suth that the two multi-pole stepping switches 297; 304 and 306; 307 and the three multi-pole, two position switches 296, 301 and 303 in switching device 281 are always set in the right position at the right time. Switch controller 210 also provides the appropriate strobe pulses for the three sets of multi-bit, parallel data transfer gates 295, 302 and 305 at the proper moment. Thus, the sequential data transfers, as previously described, are currently executed. The switch controller receives clock pulses for carrying out the prescribed junctions from the teletypewriter during the first sub-task, and removes clock pulses from the central station during the second, third, fourth, fifth and sixth sub-tasks.

The switch controller also performs an auxiliary function in controlling the first circuit in time sequence controller 211 by providing the set and reset pulses for flip-flop 365, which controls the multi-pole, two position switch in that circuit and the strobe pulses for comparator 360.

FIG. 18 illustrates switch controller 210 with legends identifying the signal on various lines throughout the central station. The terminals of switch controller 210 are as follows: X-1, X-2, X-3, X-4, and X-6 are inputs for the triggering pulse of the first, second, third, fourth and sixth sub-task, respectively. X-5 and X-10 are inputs for clock pulses from the central station and the teletypewriter buffer, respectively. X-7, X-8 and X-9 are output terminals for strobe pulses for the three set of parallel data transfer gates 295, 302, and 305, respectively. X-13 is the output for the strobe pulse to comparator 360. X-11 and X-12 are the outputs of the reset and onset pulses, respectively, to flip-flop 365 which controls multi-pole, two position sub-task switches 363 and 364 in the first circuit of timing sequence controller 211.

c. The timing circuitry

In FIG. 17, timing sequence controller 211 comprises two circuits. The first contains binary comparator 360 which compares information received from teletypewriter buffer 206 with the information stored in read only memory 361 or 362 by way of seven-pole, double-throw switches 363 and 364. The output of binary comparator 360 is coupled to either the T-2 or T-3 outputs by way of seven-pole, double-throw switch 364. The positions of switches 363 and 364 are controlled together by way of a suitable mechanical actuator under the control of flip-flop 365. The T-4 and T-5 inputs to flip-flop 365 comprise the set and reset inputs, respectively. As illustrated in FIG. 17, it is taken that an input signal on the set input will cause switches 363 and 364 to assume the positions illustrated, while an input on the reset side of flip-flop 365 will cause the switches to change to the other position.

Timing sequence controller 211 also comprises the master oscillator 365', the output of which is directly coupled to output O-1 and controlled switch 366 with its output connected to divider 367, the clock pulses at the output of which is connected to output O-2. The set output of flip-flop 368 closes control switch 366 and has the set input thereof connected to OR gate 369, the inputs to which form the O-3 and O-4 inputs to timing sequence controller 211. Input O-5 is connected to the reset of flip-flop 368.

Output O-2 is connected as one of the inputs to the A-5 input of timing sequence controller 211. Delay device 373 receives the signal to be delayed from the A-1 input by way of single-pole, double-throw switch 379 under the control of flip-flop 371 only in its reset position. Thus, only the first alarm pulse received from input A-1 is delayed by an appropriate time interval, e.g., 11 seconds, which is longer than the expected time when the pole repeater is alerted during the alarm and will return a second alarm signal concomitantly with the alarm data read out of the terminal stations associated therewith. However, the delay time is shorter than the time for the terminal station to send a repeated alarm. After the delay, one-shot 374 produces an output pulse which is coupled by way of OR gate 372 to the reset input of flip-flop 371, thereby readying the flip-flop for another alarm tone. Otherwise, during the 11 second waiting period inserted by delay 373, if a second alarm tone is received in conjunction with the alarm data, since flip-flop 371 is in set position, single-pole, double throw switch 379 will direct the alarm pulse to OR gate 372, to reset the flip-flop, thereby readying it for the next alarm. The direct and inverted outputs of flip-flop 371 are coupled separately to single-shot multivibrators 375 and 376 through two differentiators (not shown). One-shot 375 generates a pulse during the set transition of flip-flop 371 and one-shot 376 generates a pulse during the reset transition of the same flip-flop. The output pulse of one-shots 375 and 376 are connected to output terminals A-4 and A-2, respectively. Input A-7 is coupled to one-shot multivibrator 377 through delay device 380, which delays the output by one pulse interval. One-shot 377 is triggered when an external switch between terminals A-6 and A-7 is closed, during the set condition of flip-flop 371. The external switch is closed only when the control memory stepping switch is at its sixth step. Thus when the central station is inactive, control memory stepping switches 306 and 307 are not at the sixth position, the one-shot 377 will generate a pulse during the set transition of flip-flop 371. Otherwise, if the first or second subtask is in progress at central station, and flip-flop 371 is set, one-shot 377 will wait unit the first or second subtask in the control station is completed before generating its output pulse.

f. Operation

Considering in particular FIGS. 16 and 17, central station 11 operates as follows. When information from the data processing computer is fed into teletypewriter buffer 206, i.e., a code message is received from the computer, binary comparator 360 compares the information in teletypewriter buffer 206 with the information stored in read only memory 361. If the information coincides, comparator 360 produces an output pulse which is coupled to the T-2 output by way of switch 364 to initiate the loading procedure (first subtask). During this time the control memories are sequentially loaded by way of teletypewriter buffer 206 and switches 303 and 305. Strobe pulses from the X-9 output of the logic circuitry is provided to enable parallel data transfer gates 305 to pass the information to the control memories sequentially by way of multiple position switch 306. The output pulse on the T-2 output is connected to the F-9 and M-11 inputs of the data handling unit which sets flip-flop 340 and transfers the data from control memories 286 and 287 to step counter 331 and line counter 333, respectively, thus readying the system for data collection. Information stored in these two counters controls the total time duration for this data collection. The output pulse at the T-2 output of timing sequence controller 211 is coupled to the X-1 input of logic circuitry 210 which produces a signal on the X-12 output thereof. This output is connected to the T-5 input of timing sequence controller 211 which resets flip-flop 365, thereby coupling binary comparator 360 to read only memory 362. In addition, switch 364 is thrown to the other position, thereby connecting the output of comparator 360 to the T-3 output of timing sequence controller 211. After the control memories are loaded, the next information supplied to teletypewriter buffer 206 by the data processing computer is an initiation code for the third sub-task. This coincides with the data stored in read only memory 362, and binary comparator 360 produces an output pulse which is connected to the T-3 output of timing pulse sequence controller 211 to start the sequence for establishing a communication path between the central station and a particular pole repeater. This output signal is coupled to the R-5 input of fan-out transceiver 203 wherein it sets flip-flop 227 by way or OR gate 226 and sets flip-flop 224, thereby activating both the transmitting and receiving portions of fan-out transceiver 203. The signal is also coupled to the M-11 input of data handling unit 205, thereby transferring data to counters 331 and 333. Also, the signal is coupled to the 0-4 input of time sequence controller 211, thereby setting flip-flop 368 and opening gate 366. Thus, clock pulse signals are not applied throughout the system by way of output 0-2, thereby enabling the receivers and data handling unit 205 to operate.

This third sub-task is triggered by the matching of the last word (the initiation code) from the computer with the contents of read only memory 362. The third sub-task may also be triggered by an alarm condition, where a pulse derived from the alarm pulse provides the initiation of the third sub-task. This alternative initiation of the third sub-task will be more fully discussed in connection with sub-task 6.

After the third sub-task begins, the information received from a pole repeater comprises the address thereof repeated three times which is coupled through switches 295–297, sequentially to appropriate majority logic circuits. The corrected addresses at the outputs of the three majority logic circuits are coupled by switches 303–306 to the control memories. The identification of the path chosen is compared in comparators 322–324 with the intended address stored in control memories 288–290. If the addresses are not the same, one of comparators 322–324 will produce an output pulse which is coupled to control memory 291 storing a logic 1 as one of the digits thereof. This would actuate comparator 325 and cause the generation of a holding pulse on the M-8 output, thereby interrupting data reception and causing the initiation of the second sub-tasks by the data processing computer. Only if all of the addressed stored in the majority logic circuits are correct will the central station proceed with the fifth sub-task, routine data collection.

During the time intervals in which the different portions of the data from the various levels of repeaters are received, coutner 334 controls the timing of the comparisons by the position of the taps thereon so that, at the time of reception of the different address portions, the addresses are checked by comparators 323 and 324 which are activated by strobe pulses from the second and third taps on counter 334. At the end of the interval determined by the capacity of counter 334, a carry pulse is connected to terminals F-7 and M-9, and coupled to delay unit 343, thence to single-shot 344. The length of the delay by delay unit 343 is sufficient to locate the output pulse of single shot 344 in the twelfth pulse interval after counting begins in counter 334. The output of single shot 344 enables AND gate 345 for a single clock interval. The output of AND gate 345 comprises a strobe input to comparator 322 which compares the information stored in majority logic 285 and control memory 288.

The fourth sub-task is to change to a new pole repeater without changing either the substation or intermediate repeater. This sub-task is performed only when the following conditions are met:

1. After the collection of a complete line of data, a carry pulse is produced by counter 331.
2. A logic 1 is stored in the second bit position of control memory 286.
3. There is no carry pulse from counter 333.

Where the second condition is met, one input of AND gate 339 is high. Thus, under the first condition, the carry pulse appears at the output of AND gate 339 and is coupled to terminals F-5 and M-18. The output from AND gate 339 is the fourth sub-task initiation pulse and is coupled to the count input of memory 288 advancing the count thereof. Thus, during the subsequent time interval a different pole repeater is addressed. During the fourth sub-task, two things are different from the third sub-task. First, because there is no change in intermediate repeater and substation repeater, no comparison between majority logic 284 or 283 with control memories 289 or 290, respectively, is required; therefore, the strobe pulse for comparators 323 and 324 should be blocked. This is achieved by resetting flip-flop 340 at the beginning of the fourth sub-task by the carry pulse of step counter 331. Second, during the transition from the pair of alert tones for the old pole repeater to the pair of alert tones for the new pole repeater, the transmission of the pole repeater alert-tones should be temporarily blocked during the transition period. This is achieved by a controlled switch in the output path of alerting tone generator 209, the switch is controlled by inverted output of the flip-flop connected thereto. The set signal for this flip-flop is the output of AND gate 339, and the reset signal is the output at first tap at counter 334 located at the second pulse after counting starts there. Thus, at the beginning of the fourth sub-task the alert tones for the pole repeater are blocked for two pulse intervals.

At the end of the third sub-task, before the seven-pole, two-position switch 296 switches to its second position for the fifth sub-task, the connection through the first position remains connected to majority logic 285. Thus at the beginning of fourth sub-task, only switch 296 need return to its first position to enable the address code received to be transferred to the proper majority logic circuit. Then the strobe pulse for comparator 322 is produced exactly the same way as in third sub-task. If no discrepancy occurs during this comparason, then the central station will proceed to the fifth sub-task automatically, as at the end of the third sub-task. Otherwise, a discrepancy in the comparison causes the generation of a holding pulse, causing the central station to proceed to the second sub-task and terminate the routine data collection.

After the completion of the third sub-task, the fifth sub-task begins automatically, in which data relayed from a particular pole repeater through a specific transmission path selected by the address tones corresponding to the codes stored in control memories 288–290 are coupled through the data buffer in decoding logic by way of switch 296, parallel data transfer gate 295, through code transformation unit 299, switch 301 and parallel data transfer gate 302 to teletypewriter buffer 206.

Actually, this routine data collection begins at the last interval determined by the capacity of gate counter 334; then a carry pulse is applied to the set input of flip-flop 337. This pulse actuates switch 338 to the set position, thereby coupling clock-pulse signals to the input of step counter 331, beginning the routine data collection. At the end of an interval determined by the capacity of step counter 331, during which a complete line of data should be received from the pole repeater, a carry pulse is produced that is coupled to the reset input of flip-flops 337 and 340 and to one input of AND gate 339, ending the fifth sub-task.

The process of changing the pole repeater address without recourse to the data processing unit may continue until all the pole repeaters, as determined by the capacity of line counter 333, have been reached without changing substation repeaters. The carry output of counter 333 is also coupled to the count input of line counter 333. Depending upon the capacity of counter 333, as determined by the contents stored from control memory 287, line counter 333 counts down and, upon crossing 0, produces a carry output signal which is coupled to OR gate 326 and terminates the communication through the network as described before. Because the carry pulse violates the third condition noted above for the initiation of the fourth sub-task; at the end of the extended data collection, the fourth sub-task will not be performed again. At this point, the data processing computer is notified of the termination of the readings and may either stop the readings for a given time interval or initiate a new set of readings with a different address stored in control memories 288–290, thereby selecting a different path through the communication network to a particular pole repeater or group of pole repeaters.

It is understood that if the contents of the second control memory, control memory 281, comprised a logic 1 at the unit's position (at the seventh bit position), then line counter 333 would have a capacity of one and only a single pole repeater would be interrogated in that particular cycle from the data processing computer. At the end of the single line of data, data collection would be terminated until the data processing computer applied a new address to control memories 288–290. This data collection format is particularly useful in collecting alarm data or in re-reading an erroneous meter reading.

A routine data collection is terminated by the second sub-task in which the contents of the control memories are read back to the data processing computer. The second sub-task is initiated by a pulse at the M-7 terminal (FIG. 11). This pulse is produced by OR gate 328 (FIG. 16) in response to a pulse from OR gate 326, which, in turn, receives a pulse from line counter 333 at the end of the last line of data as counter 333 cycles through zero.

The output pulse from OR gate 326 goes to both of OR gates 327 and 328. The output from OR gate 328 is stored as a logic 1 in control memory 291. The output from OR gate 327 receives its input either from OR gate 326 or OR gate 346, which encompasses all the situations in which one or more bits in control memory 291 has been set to a logic 1, producing a strobe pulse for comparator 325, which produces a holding pulse at the output thereof since the contents of memory 291 no longer match the contents of read only memory 329. The holding pulse shuts off the clock signal by resetting flip-flop 368 (FIG. 17) and shuts off transceiver 203 by resetting flip-flops 224 and 227 (FIG. 12). The pulse applied to X-2 of switch control 210 causes switching device 281 to sequentially read out the control memories to the data processing computer through teletypewriter buffer 206.

The sixth sub-task is the response by the central station to an alarm originated from a terminal station. This sub-task, because the timing of the alarm is unpredictable, may occur in one of the following three situations: (a) when the central station is inactive; (b) when the first or second sub-task is in progress; (c) when the third, fourth, or fifth sub-task is in progress. The response to the alarm can be subdivided into two portions, the immediate actions and the delayed actions which may wait until the central station can properly terminate its current activity. The immediate reactions are the setting of alarm flip-flop 371 in the timing sequence controller (FIG. 17), turning on the data receiver, if it is not on, by way of flip-flop 227 (FIG. 12), and turning off the transmitter, if it is not turned off, by way of the reset input to flip-flop 224 (FIG. 12). The delayed reactions are the initiation of the second sub-tasks for properly terminating the current activity in the central station, e.g., when the first or second sub-task is in progress, the response is delayed until the data processing computer has completed the loading or reporting back task.

An alarm signal received by way of line coupler 201 and frequency dividing network 202 (FIG. 12) causes alarm receiver 221 to produce an output pulse on output R-1. This output is connected to the A-1 input of timing sequence controller 211 (FIG. 17). This pulse switches flip-flop 371 to the set position and is coupled by way of delay 373 to single-shot multivibrator 374 through switch 379 which is in the reset position until flip-flop 371 responds to the incoming pulse and assumes the set position, whereupon switch 371 changes position and couples input A-1 to one input of OR circuit 372. This portion of timing sequence controller 211 functions as described previously to wait for a repeat of the alarm or for the particular pole repeater to respond to the alert tone to be transmitted by the central station.

Flip-flop 371 produces an output pulse which is coupled to the A-6 output and to the A-4 output, by way of single-shot multivibrator 375. The output from single-shot multivibrator 374 is applied to the reset input of flip-flop 224 (FIG. 12) by way of OR gate 225. The same input signal is coupled to the set input of flip-flop 227 by way of OR gate 226. The effect of this is to turn off the transmitting portion and turn on the receiving portion of fan-out transceiver 203. Thus, transceiver 203 is ready to receive the data following the alarm tone which identifies the communication path through the system. The alarm pulse at output A-4 is connected to input X-6 of switch control 210 to trigger the generation of control pulses for the sixth sub-task, since the repeater identification codes which follow an alarm tone are interleaved and repeated five times. In addition to switching the multi-pole, two-position switch, the majority logic stepping switch must stop at every pulse interval for five revolutions so that every received address code will be sequentially loaded into the proper majority logic. Then, through majority logic stepping switch and control memory stepping switch together, the correct address code at the output of majority logic is loaded into corresponding control memories. Thus, the central station is placed in a quiescent state even when it has had data collection interrupted by an alarm. Thus, after the incoming address codes are stored in the control memories, the remaining control memories properly set, the third sub-task is initiated to establish a two-way communication path, following the path originally taken by the alarm tone, for collecting alarm data. The procedure for alarm data collection is not different from routine data collection from a single pole repeater. The only difference is when the terminal station originating the alarm takes its turn to transmit its alarm data, it will also transmit an alarm tone concomitantly with the data.

The receipt of the alarm tone with the alarm data, when flip-flop 371 is set, the alarm pulse within the delay interval set by delay 373 (FIG. 17) is coupled from the A-1 input to OR gate 312 by switch 379 in the "set" position. The output of OR gate 372 is coupled to the reset input of flip-flop 371. The output of flip-flop 371 causes a pulse at the output of single-shot multivibrator 376, the output of which is connected to the A-2 output of timing sequence controller 211.

This output signal is coupled to the M-16 input of data handling unit 205 (FIG. 16) as the inputs to OR circuits 328 and 346. The output of OR circuit 346 is coupled by OR circuit 327 to the strobe input of comparator 325. The outputs of OR circuits 328 and 346 cause a logic 1 to be stored in the first and second bit positions of comparator 291. The timing of this comparison provides the data processing computer with the identification of the terminal station generating the alarm, and initiates the second sub-task, thereby terminating further data collection.

As previously noted, the logic in decoding logic 204 can sense either absence of data or certain types of erroneous data. If either of these conditions occur during data collection, flip-flop 272 (FIG. 13) goes into the set state, producing a logic 1 output at D-1. This pulse is coupled to the F-6 terminal of the data handling unit (FIG. 16). This pulse changes the count in the data counter 332 if all time slots for data transmission assigned to a pole repeater contain missing or erroneous data. The counts in counter 332 will be identical to the last fine bits of control memory 286. When comparator 321 is strobed it produces an output signal which is coupled to OR gate 326, triggering the second sub-task as previously described. The output from comparator 321 is also coupled to the second bit position of control memory 291 to provide a coded description of the malfunction. The data processing computer can then take the appropriate action.

CONCLUSION

Thus, the central station operates as a data interface for the data processing computer and comprises what may be considered a segmented data bus in which data is selectively circulated within the central station among storage units and comparators so that the central station can operate semi-autonomously, or under the complete control of the data processing computer, depending upon whether a single line of data or a plurality of lines of data are to be collected. It will be apparent to those of skill in the art that the data collection can be made more autonomous by the addition of counters and logic circuitry to automatically select a new substation or intermediate repeater address in addition to the selection of different pole repeater addresses.

As previously noted, the power distribution system herein described is a simplified form of power distribution system as compared to systems in actual use. These actual systems comprise a number of closed loops, open loops, and permanent radials in various combinations. Also, the lines may be poly-phase rather than single-phase as implicit in the foregoing description of the present invention. These complexities do not affect the operation of the present invention.

There is one variation between the power system upon which the foregoing description of the present invention is based and some actual power systems which, while not affecting the invention, per se, may cause slight confusion. Specifically, the term "central station" as used herein may not correspond to that term as used by some utilities. Specifically, the "central station" as used herein may not be the same as the central station referred to by some utilities in describing the power distribution grid. Stated another way, the central station described herein may be considered a "petit" central station in a larger network having a more comprehensive central station. In such case, the teletypewriter output is merely one terminal among many to a time sharing computer.

When the central data processing computer is connected to many petit central stations, one each through its teletypewriter terminals, then a teletypewriter terminal selection code is incorporated in the software of the computer. This can serve as a petit central station identification code due to the one to one correspondence of terminals and petit central stations and is easily accomplished by making the initiation code stored in read only memory 362 (FIG. 17) different for each petit central station. In this way, only the instruction loaded into the correct petit central station can be executed by matching the initiation code with the code stored in read only memory 362.

There is provided by the present invention a unique data communication system for an extremely hostile environment. The system, by utilizing both address and time multiplex selection, provides an economical apparatus for collecting data from a large number of terminal stations. The individual portions of the system conserve power by having minimal apparatus on all the time, which also reduces the chances of self-generated interference. The system increases communication reliability, over and above that obtained from the loops built into the power distribution network, by including by-pass capability at the power distribution points of the network.

It will be apparent to those of skill in the art that various modifications can be made within the spirit and scope of the present invention. For example, while some error checking circuitry has been disclosed, additional error checking circuitry, known in the art, can be utilized at various levels of the present invention. Also, various main and stand-by power supplies can be utilized with the system of the present invention since the system may function despite a power interrupting fault by virtue of its circuit interrupter by-passing capability. Also, while the various repeaters have been described as at discrete physical locations, some or all the repeaters at one level may be merged and physically located with the repeaters at a higher level or, in the case of the intermediate repeaters, physically located in the central station. In this variation, the appropriate receiving and transmitting portions of the repeaters are eliminated.

What I claim as new and desire to secure by Letters Patent of the United States is:

1. A repeater for relaying information in a two-way communication system utilizing a power line distribution network as the communication medium, said repeater comprising:
   coupling means for coupling said repeater to the power lines at positions adjacent a power distribution node;
   first receiving means for receiving a signal in a first band of frequencies from a first direction and producing a pulse indicative thereof;
   timing means coupled to said first receiving means for controlling the operation of said repeater and starting said operation in response to said pulse;
   first tone generating means, operatively connected to said first receiving means and responsive to said pulse, for generating at least one tone in a second band of frequencies;
   second receiving means, for receiving a signal in a thrid band of frequencies from a second direction and producing a pulse indicative thereof;
   second tone generating means, operatively connected to said second receiving means and responsive to the output thereof for generating at least one tone in a fourth band of frequencies;
   first and second amplifying means coupled to said first and second tone generating means, respectively, for amplifying the outputs thereof; and
   frequency dividing means connected to the inputs of said first and second receiving means and to the outputs of said first and second amplifying means for isolating the signals from and to said first and second amplifying means and said first and second receiving means, respectively, and connecting said first and second amplifying and said first and second receiving means to said coupling means.

2. The repeater as set forth in claim 1 wherein said power distribution node comprises a step-down transformer and said coupling means is connected to the primary and secondary thereof, to by-pass the transformer at signal frequencies.

3. The repeater as set forth in claim 1 wherein said tone generating means comprises logic controlled transfer oscillators operating in different frequency bands.

4. The repeater as set forth in claim 1 wherein a portion of said repeater operates continuously and the remainder operates for the duration of said pulse from said first receiving means.

5. The repeater as set forth in claim 1 and further comprising:
   priority signal receiving means for receiving a priority signal from said second direction;
   third tone generating means operatively connected to said priority signal receiving means for regenerating said priority signal by generating at least one tone in a fifth band of frequencies, the output of said third tone generating means being coupled to said second amplifying means; and
   logic means for actuating said repeater to enable the transmission of said regenerated priority signal.

6. The repeater as set forth in claim 5 wherein said fifth band of frequencies and said fourth band of frequencies are the same.

7. The repeater as set forth in claim 5 said logic means comprising:

starting means, coupled to said priority signal receiving means, for turning on said repeater in response to a priority signal; and logic timing means for turning off said repeater a predetermined time after receiving said priority signal.

8. The repeater as set forth in claim 7 and further comprising:

switch means, coupled to said priority signal receiving means, for interrupting other communications by said repeater when a priority signal is received.

9. The repeater as set forth in claim 1 wherein said first receiving means comprises:

at least two tone receivers, each responsive to a particular frequency in said first band; and AND logic means connected to the outputs of said two receivers, thereby enabling said repeater to be addressed.

10. The repeater as set forth in claim 9 and further comprising:

address code storage means for storing an address code singular to the repeater; and logic means interconnecting said address code storage means, said second receiving means, and said second tone generating means for causing said second tone generating means to alternately generate tones under the control of said second receiving means and said address code storage means.

11. The repeater as set forth in claim 10 wherein said logic means is connected to a timing means to cause said address code to be repeated a predetermined number of times at fixed intervals.

12. A plurality of repeaters as set forth in claim 10 connected in at least two voltage levels of said power line distribution network wherein at least two repeaters at a lower level are connected to one repeater at the higher level, thereby forming a tree-like network of repeaters superimposed on said power distribution network.

13. A plurality of repeaters as set forth in claim 12 wherein said power distribution node comprises a step-down transformer, the lowest level of repeaters is coupled to only one side of said transformer, and said signals are coupled by the interwinding capacitance to the other side of said transformer.

14. A plurality of repeaters as set forth in claim 13 wherein said signals have a frequency of less than 15 Khz.

15. A plurality of repeaters as set forth in claim 12 wherein a timing means in the lower level causes said address tones to occur at different time intervals from those at other levels thereby interleaving said repeated address tones.

16. A plurality of repeaters as set forth in claim 15 wherein said timing means in each repeater comprises a counter having at least one tap thereon, the position of the taps being different at each level, to cause the timing of the repeated address codes to differ for each level.

* * * * *